US008909066B2

(12) United States Patent
Yoshida et al.

(10) Patent No.: US 8,909,066 B2
(45) Date of Patent: Dec. 9, 2014

(54) OPTICAL TRANSFER SYSTEM, OPTICAL TRANSMISSION DEVICE, AND OPTICAL RECEPTION DEVICE

(75) Inventors: Tsuyoshi Yoshida, Tokyo (JP); Takashi Sugihara, Tokyo (JP); Kazuyuki Ishida, Tokyo (JP); Takashi Mizuochi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 145 days.

(21) Appl. No.: 13/814,617

(22) PCT Filed: Sep. 30, 2011

(86) PCT No.: PCT/JP2011/072638
§ 371 (c)(1),
(2), (4) Date: Feb. 6, 2013

(87) PCT Pub. No.: WO2012/073590
PCT Pub. Date: Jun. 7, 2012

(65) Prior Publication Data
US 2013/0136451 A1 May 30, 2013

(30) Foreign Application Priority Data

Nov. 30, 2010  (WO) .................. PCT/JP2010/006967

(51) Int. Cl.
*H04B 10/00* (2013.01)
*H04J 14/06* (2006.01)
*H04B 10/50* (2013.01)
*H04B 10/61* (2013.01)
*H04J 14/00* (2006.01)
*H04B 10/532* (2013.01)

(52) U.S. Cl.
CPC ............ *H04J 14/06* (2013.01); *H04B 10/5053* (2013.01); *H04B 10/616* (2013.01); *H04J 14/002* (2013.01); *H04B 10/532* (2013.01)
USPC .......................................... 398/184; 398/152

(58) Field of Classification Search
CPC .................................................... H04B 10/5561
USPC ...................................................... 398/184, 152
See application file for complete search history.

(56) References Cited

U.S. PATENT DOCUMENTS

| 2009/0022498 | A1* | 1/2009 | Shibutani ...................... 398/152 |
| 2009/0060508 | A1* | 3/2009 | Tanimura et al. .............. 398/65 |
| 2011/0044702 | A1* | 2/2011 | Mizuguchi et al. ........... 398/184 |

FOREIGN PATENT DOCUMENTS

| JP | 11 88299 | 3/1999 |
| JP | 2003 21816 | 1/2003 |

(Continued)

OTHER PUBLICATIONS

Office Action issued Jun. 11, 2013 in Japanese Patent Application No. 2012-546729 (with partial English language translation).

(Continued)

*Primary Examiner* — Danny Leung
(74) *Attorney, Agent, or Firm* — Oblon, Spivak, McClelland, Maier & Neustadt, L.L.P.

(57) ABSTRACT

In an optical transfer system, an optical transmission unit generates an optical signal in which respective polarization components are alternately present on a time axis, a time period during which the respective polarization components are simultaneously present on the time axis is substantially zero, and a symbol repetition cycle of optical signals of the respective polarization components becomes Ts, an optical reception unit causes an interference between local oscillation light and a received optical signal and converts an interfered optical signal to an electric signal, and a received electric-signal processing unit performs analog-digital conversion of an electric signal, elimination of a delay difference of Ts/2 between the respective polarized signal components, and adaptive equalization of a distortion other than the delay difference.

16 Claims, 15 Drawing Sheets

(56) References Cited

FOREIGN PATENT DOCUMENTS

| JP | 2005-260696 A | 9/2005 |
|---|---|---|
| JP | 2009 27525 | 2/2009 |
| JP | 2009 60461 | 3/2009 |
| JP | 2009 529834 | 8/2009 |
| JP | 2009 278338 | 11/2009 |
| JP | 2010 118842 | 5/2010 |
| JP | 2010 243953 | 10/2010 |

OTHER PUBLICATIONS

Tanimura, T., et al., "Semi-blind Multi-Stage Dual Polarization Nonlinear Compensation in 112 Gb/s DP-QPSK Coherent Receiver," The Institute of Electronics, Information and Communication Engineers, vol. 110, No. 152, pp. 57-62, (Jul. 22, 2010), (with English Abstract).

Zhang, B., et al., "Penalty-Free Transmission of 127-Gb/s Coherent PM-QPSK over 1500-km of NDSF with 10 Cascaded 50-GHz ROADMs," OSA/OFC/NFOEC, NTuC5, Total 3 Pages, (2010).

Jianjun, Y. et al., "20x112Gbit-s—50 GHz spaced—PolMux-RZ-QPSK straightline transmission over 1540km of SSMF employing digital coherent detection and pure EDFA amplification," ECOC, vol. 4, pp. 59-60 (Sep. 2008).

Savory, S., "Digital filters for coherent optical receivers," Optics Express, vol. 16, No. 2, pp. 804-817, (Jan. 21, 2008).

"100G Ultra Long Haul DWDM Framework Document," Optical Internetworking Forum, http://www.oiforum.com/public/documents/OIF-FD-100G-DWDM-01.0.pfd, Total 10 Pages, (Jun. 2009).

International Search Report Issued Nov. 8, 2011 in PCT/JP11/72638 Filed Sep. 30, 2011.

Japanese Office Action issued Oct. 22, 2013, in Japan Patent Application No. 2012-546729 (with English translation).

\* cited by examiner

OPTICAL TRANSFER SYSTEM, OPTICAL TRANSMISSION DEVICE, AND OPTICAL RECEPTION DEVICE

FIELD

The present invention relates to an optical transfer system, an optical transmission device and an optical reception device using a digital coherent method.

BACKGROUND

For large-capacity optical transfer such as 40 Gbit/s and 100 Gbit/s, there are problems such that optical signal-to-noise power limitations need to be overcome and high-density wavelength multiplexing need to be realized. As a technique for overcoming optical signal-to-noise power limitations, utilization of binary phase-shift keying (BPSK) and quaternary phase-shift keying (QPSK) has been known, as an alternative to the conventional On-Off Keying (OOK). Furthermore, to realize high-density wavelength multiplexing, there have been known a method of doubling the number of transfer bits per one symbol by polarization multiplexing that allocates an independent signal to each of two orthogonal polarization components, and a method of increasing the number of transfer bits per one symbol by increasing signal multiplicity such as QPSK and 16 quadrature amplitude modulation (QAM). The QPSK and 16 QAM allocate a signal to an In-phase axis (I-axis) and a quadrature-phase axis (Q-axis) and transfer the signals in an optical transmitter.

Further, a digital coherent method of receiving these optically modulated signals by combining digital signal processing with a synchronous detection method has been attracting attention. In this method, stable separation of multiplexed signals and restoration to the original signals in a receiver can be performed by linear photoelectric conversion using synchronous detection and fixed, semi-fixed, and adaptive linear equalization by the digital signal processing. Therefore, remarkable equalization characteristics and remarkable noise immunity with respect to a linear waveform distortion resulting from wavelength dispersion, polarization-mode dispersion (PMD), or the like occurring in a transfer line can be realized.

Generally, in the digital coherent method, a polarization multiplexing method in which independent signal components (Ex and Ey) are allocated respectively to each of two orthogonal polarization components (an X-polarization component and a Y-polarization component) is used. FIGS. 23 and 24 depict an expression of a time axis of a polarization-multiplexed signal generally used in a conventional polarization multiplexing method. FIG. 23 is an example in which Ex and Ey are bit-synchronized completely on a time axis. FIG. 24 is an example in which Ex and Ey are shifted by a half symbol on a time axis (see, for example, Non Patent Literature 1 and Non Patent Literature 2).

CITATION LIST

Non Patent Literatures

Non Patent Literature 1: Seb J. Savory, "Digital Filters for Coherent Optical Receivers", Optics Express, vol. 16, no. 2, pp. 804-817, 2008. Non Patent Literature 2: Optical Internetworking Forum, "100G Ultra Long Haul DWDM Framework Document", http://www.oiforum.com/public/documents/OIF-FD-100G-DWDM-01.0.pdf, June 2009.

SUMMARY

Technical Problem

However, according to the conventional techniques, because signal components Ex and Ey having the same wavelength are multiplexed simultaneously on the X-polarization component and the Y-polarization component orthogonal to each other on the time axis, there is a problem that a nonlinear interaction occurs between Ex and Ey due to a nonlinear optical effect in the optical fiber. A nonlinear interference occurring between Ex and Ey cannot be equalized by a linear adaptive equalizer in the receiver, thereby causing excessive deterioration of the signal quality.

For example, in a time waveform shown in FIG. 23, because Ex and Ey are bit-synchronized completely on the time axis, the nonlinear interference between Ex and Ey causes deterioration of the transfer quality. In the time waveform shown in FIG. 24, because waveform peaks of Ex and Ey are shifted timewise, deterioration of the transfer quality due to the nonlinear interaction can be decreased. However, because an overlapped time is present between Ex and Ey, a nonlinear interference between Ex and Ey occurs due to the nonlinear optical effect in the optical fiber.

The present invention has been achieved to solve the above problems, and an object of the present invention is to reduce a nonlinear interference occurring in orthogonal polarization-multiplexed signals and to improve the transfer quality.

Solution to Problem

An optical transfer system according to the present invention including an optical transmission unit including a pulse-signal generation unit that generates a pulse signal having a pulse width equal to or less than Ts/2 with respect to a symbol repetition cycle Ts, a data modulation unit that generates a data modulation signal based on a transmission data signal, and a polarization interleaving unit that generates a polarization-multiplexed signal in which a delay difference between two polarization components that are substantially orthogonal to each other is one-half (Ts/2) of the symbol repetition cycle Ts; an optical reception unit including a local oscillation light source that generates light corresponding to a central wavelength of an optical signal received from the optical transmission unit, an optical interference unit that causes an interference between light generated by the local oscillation light source and an optical signal received from the optical transmission unit, and a photoelectric conversion unit that converts an output from the optical interference unit to an electric signal; a received electric-signal processing unit including an analog-digital conversion unit that converts an electric signal output from the optical reception unit to a digital signal; and a digital-signal processing unit that performs elimination of a delay difference of Ts/2 between polarized signal components and adaptive equalization of a distortion other than the delay difference with respect to the digital signal, wherein the optical transmission unit generates an optical signal in which respective polarization components are alternately present on a time axis, a time period during which the respective polarization components are simultaneously present on the time axis is substantially zero, and a repetition cycle of optical signals of the respective polarization components becomes Ts.

Advantageous Effects of Invention

According to the present invention, a nonlinear interference occurring between orthogonal polarization-multiplexed signals can be reduced, and the transfer quality can be improved.

DESCRIPTION OF EMBODIMENTS

Exemplary embodiments of an optical transfer system according to the present invention will be explained below in detail with reference to the accompanying drawings. The following embodiments are only illustrative embodiments for embodying the present invention, and the invention is not intended to be limited thereto.

First Embodiment

Figure 1:
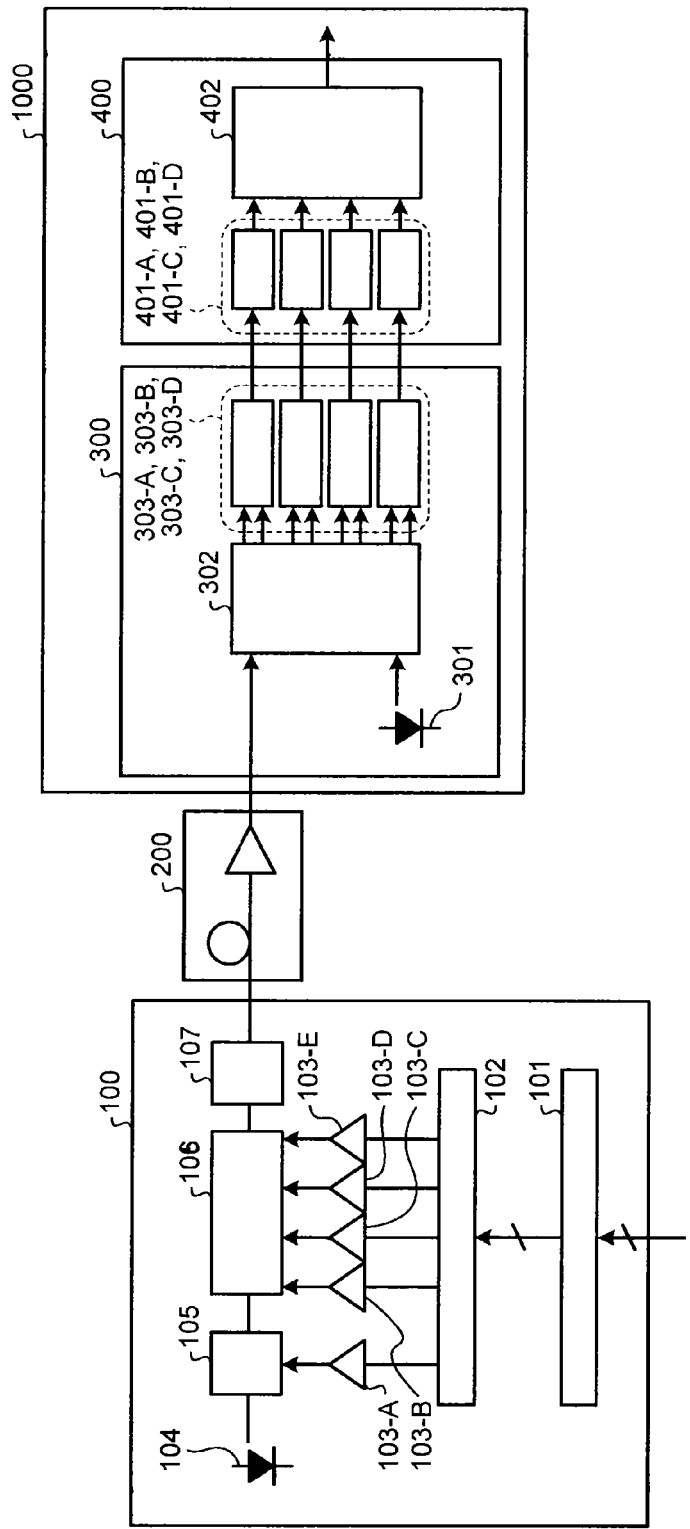
FIG. 1 is a configuration example of an optical transfer system according to a first embodiment of the present invention.

FIG. 1 is a configuration example of an optical transfer system according to a first embodiment of the present invention. As shown in FIG. 1, the optical transfer system according to the present embodiment includes an optical transmission unit (optical transmission device) 100, an optical transfer unit 200, and an optical reception device 1000. The optical reception device 1000 includes an optical reception unit 300 and a received electric-signal processing unit 400. This configuration applies to other optical transfer systems according to the embodiment described below. An optical signal transmitted from the optical transmission unit 100 reaches the optical reception unit 300 via the optical transfer unit 200. The received optical signal is converted to an electric signal by the optical reception unit 300, and electrically signal-processed by the received electric-signal processing unit 400.

The optical transmission unit 100 includes a first electric signal source 101, a second electric signal source 102, electric amplifiers 103-A, 103-B, 103-C, 103-D, and 103-E, a light source 104, a Mach-Zehnder modulator 105, a polarization-multiplexing dual-parallel Mach-Zehnder modulator 106, and a polarization interleaver 107.

The optical transfer unit 200 connects the optical transmission unit 100 and the optical reception unit 300. The optical transfer unit 200 can include various devices assumed in the normal optical transfer system such as an optical fiber, an optical multiplexer/demultiplexer, a wavelength dispersion compensator, and an optical amplifier.

The optical reception unit 300 includes a local oscillation light source 301, an optical 90-degree hybrid 302, and balanced photoelectric convertors 303-A, 303-B, 303-C, and 303-D.

The received electric-signal processing unit 400 includes analog-digital convertors 401-A, 401-B, 401-C, and 401-D, and a digital-signal processing unit 402.

An operation of the optical transfer system according to the present embodiment is explained below. An example of generating a 40 Gbit/s polarization-multiplexed QPSK optical signal is explained below. With the 40 Gbit/s polarization-multiplexed QPSK optical signal, communications can be performed at a rate of 4 bits per symbol, and a symbol repetition frequency fs is 10 gigahertz. A symbol repetition cycle is designated as Ts (=1/fs). The present embodiment can be applied to other transfer rates and various modulation methods, and is not limited to this example. In the present embodiment, respective polarization components of the polarization-multiplexed QPSK optical signal are interleaved to generate a polarization-multiplexed and interleaved QPSK optical signal.

The first electric signal source 101 generates a clock signal and four data signals, that is, an X-polarization/I-axis electric signal exI, an X-polarization/Q-axis electric signal exQ, a Y-polarization/I-axis electric signal eyI, and a Y-polarization/Q-axis electric signal eyQ based on a transmission data signal input from outside. For example, the four data signals are respectively expanded in parallel, and are slowed down to 1/16 of the actual bit rate of 40 Gbit/s. The clock signal is similarly slowed down. The first electric signal source 101 outputs the four data signals and the clock signal slowed down to a speed of 1/16 to the second electric signal source 102. Slowing down by the above ratio is an example only, and the present invention is not limited thereto. The four data signals correspond to an example of a first electric signal in the present invention, and the clock signal corresponds to an example of a second electric signal in the present invention.

The second electric signal source 102 generates four data signals having a symbol rate fs (=10 Gsymbol/s) and a pulse signal having a pulse width of Ts/2 (=50 picoseconds) only once in two cycles, assuming a cycle as Ts/2 (=50 picoseconds), from the input four-system data signals and clock signal. The second electric signal source 102 outputs the generated X-polarization/I-axis electric signal to the electric amplifier 103-B, the generated X-polarization/Q-axis electric signal to the electric amplifier 103-C, the generated Y-polarization/I-axis electric signal to the electric amplifier 103-D, the generated Y-polarization/Q-axis electric signal to the electric amplifier 103-E, and the generated pulse signal to the electric amplifier 103-A. In the present embodiment, while the pulse width is designated as Ts/2, the pulse width can be equal to or less than Ts/2 to reduce a nonlinear interference between the polarization components. The generated four data signals correspond to an example of a third electric signal in the present invention, and the generated pulse signal corresponds to an example of a fourth electric signal.

The above pulse signal can be obtained by performing a logical AND of the clock signals, for example, between a signal frequency fs/2 (=5 gigahertz) and the frequency fs (=10 gigahertz). As an example, a logical AND d3 of a logical clock signal d1 of the frequency fs/2 (=5 gigahertz) and a logical clock signal d2 of the frequency fs (=10 gigahertz) can be obtained by the following equations.

$$d1=0,0,1,1,0,0,1,1,0,0, \quad (1)$$

$$d2=0,1,0,1,0,1,0,1,0,1, \quad (2)$$

$$d3=0,0,0,1,0,0,0,1,0,0, \quad (3)$$

Note that a time width taken by one logic corresponds to Ts/2 (=50 picoseconds). The logical clock signals d1 and d2 can be respectively assumed as a typical logical RZ (Return to Zero) signal with a duty ratio of 50%. Meanwhile, it is understood that the logical clock signal d3 becomes a logical RZ signal with a duty ratio of 25% having a pulse once in two cycles with respect to the cycle Ts/2 (=50 picoseconds) of the logical clock signal d2.

The electric amplifier 103-A amplifies the pulse signal input from the second electric signal source 102 until the pulse signal becomes substantially the same as the half-wavelength voltage of the Mach-Zehnder modulator 105, and outputs the pulse signal to the Mach-Zehnder modulator 105. The electric amplifier 103-B amplifies the X-polarization/I-axis electric signal input from the second electric signal source 102 up to substantially twice the half-wavelength voltage of the polarization-multiplexing dual-parallel Mach-Zehnder modulator 106, and outputs the signal to the polarization-multiplexing dual-parallel Mach-Zehnder modulator 106. The electric amplifier 103-C amplifies the X-polarization/Q-axis electric signal input from the second electric signal source 102 up to substantially twice the half-wavelength voltage of the polarization-multiplexing dual-parallel Mach-Zehnder modulator 106, and outputs the signal to the polarization-multiplexing dual-parallel Mach-Zehnder modulator 106. The electric amplifier 103-D amplifies the Y-polarization/I-axis electric signal input from the second electric signal source 102 up to substantially twice the half-wavelength voltage of the polarization-multiplexing dual-parallel Mach-Zehnder modulator 106, and outputs the signal to the polarization-multiplexing dual-parallel Mach-Zehnder modulator 106. The electric amplifier 103-E amplifies the Y-polarization/Q-axis electric signal input from the second electric signal source 102 to substantially twice the half-wavelength voltage of the polarization-multiplexing dual-parallel Mach-Zehnder modulator 106, and outputs the signal to the polarization-multiplexing dual-parallel Mach-Zehnder modulator 106.

The light source 104 generates CW light, and outputs the CW light to the Mach-Zehnder modulator 105.

The Mach-Zehnder modulator 105 pulse-modulates the CW light input from the light source 104 by the amplified pulse signal input from the electric amplifier 103-A to generate a pulsed optical signal, and outputs the pulsed optical signal to the polarization-multiplexing dual-parallel Mach-Zehnder modulator 106. The Mach-Zehnder modulator 105 corresponds to an example of a pulse-signal generation unit according to the present invention. The pulse-signal generation unit can use methods other than the Mach-Zehnder modulator. For example, the pulse-signal generation unit can be an electroabsorption optical modulator or the like.

Figure 2:
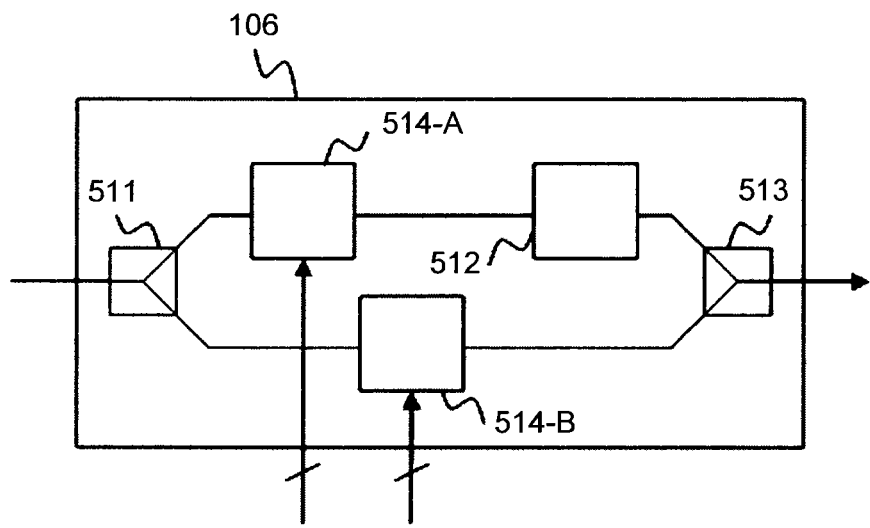
FIG. 2 is a configuration example of a polarization-multiplexing dual-parallel Mach-Zehnder modulator according to the first embodiment of the present invention.

FIG. 2 is a configuration example of the polarization-multiplexing dual-parallel Mach-Zehnder modulator according to the present embodiment. As shown in FIG. 2, the polarization-multiplexing dual-parallel Mach-Zehnder modulator 106 includes an optical branching unit 511, a polarization conversion unit 512, an optical coupling unit 513, data modulation units 514-A and 514-B. The polarization-multiplexing dual-parallel Mach-Zehnder modulator 106 generates two space-division multiplexed single-polarization signals, and polarization-multiplexes the generated two optical signals.

The polarization-multiplexing dual-parallel Mach-Zehnder modulator 106 QPSK-modulates and polarization-multiplexes the pulsed optical signal input from the Mach-Zehnder modulator 105 to generate a polarization-multiplexed QPSK optical signal, and outputs the polarization-multiplexed QPSK optical signal to the polarization interleaver 107. The polarization-multiplexed QPSK modulation in the polarization-multiplexing dual-parallel Mach-Zehnder modulator 106 uses the amplified X-polarization/I-axis electric signal input from the electric amplifier 103-B, the amplified X-polarization/Q-axis electric signal input from the electric amplifier 103-C, the amplified Y-polarization/I-axis electric signal input from the electric amplifier 103-D, and the amplified Y-polarization/Q-axis electric signal input from the electric amplifier 103-E.

An operation of the polarization-multiplexing dual-parallel Mach-Zehnder modulator 106 in FIG. 2 is explained next. The optical branching unit 511 branches an optical signal into two, while maintaining the polarization state of the input optical signal, and outputs the respective branched optical signals to the data modulation units 514-A and 514-B. The data modulation unit 514-A modulates the optical signal input from the optical branching unit 511 with an electric signal for data modulation input from outside, and outputs the modulated optical signal to the polarization conversion unit 512. The polarization conversion unit 512 converts the polarization state of the optical signal input from the data modulation unit 514-A so that the polarization state of the optical signal to be input and the polarization state of the light to be output become orthogonal to each other, and outputs the optical signal with the polarization state being converted to the optical coupling unit 513. The data modulation unit 514-B modulates the optical signal input from the optical branching unit 511 with the electric signal for data modulation input from outside, and outputs the modulated optical signal to the optical coupling unit 513. The optical coupling unit 513 couples the optical signal input from the polarization conversion unit 512 and the optical signal input from the data modulation unit 514-B while maintaining the polarization state, and outputs the coupled optical signal to outside.

For example, when the 40 Gbit/s polarization-multiplexed QPSK optical signal is to be generated, an X-polarization dual-parallel Mach-Zehnder modulator can be used for the data modulation unit 514-A and a Y-polarization dual-parallel Mach-Zehnder modulator can be used for the data modulation unit 514-B. The 10 Gsymbol/s X-polarization/I-axis electric signal and X-polarization/Q-axis electric signal are input in parallel to the X-polarization dual-parallel Mach-Zehnder modulator. The 10 Gsymbol/s Y-polarization/I-axis electric signal and Y-polarization/Q-axis electric signal are input in parallel to the Y-polarization dual-parallel Mach-Zehnder modulator. The X-polarization dual-parallel Mach-Zehnder modulator performs QPSK modulation according to the X-polarization/I-axis electric signal and the X-polarization/Q-axis electric signal. The Y-polarization dual-parallel Mach-Zehnder modulator performs QPSK modulation according to the Y-polarization/I-axis electric signal and the Y-polarization/Q-axis electric signal.

A general Mach-Zehnder modulator can be used for the data modulation unit 514-A, instead of the dual-parallel Mach-Zehnder modulator in which two Mach-Zehnder modulators are connected in parallel. The same thing applies to the data modulation unit 514-B. The Mach-Zehnder modulator used for the data modulation units 514-A and 514-B can be appropriately selected depending on the modulation method and the required transfer quality.

The second electric signal source 102 performs synchronous control for bit-synchronizing the timing of pulsed modulation in the Mach-Zehnder modulator 105 and each QPSK modulation in the polarization-multiplexing dual-parallel Mach-Zehnder modulator 106. For example, the method of bit synchronization can be a method in which synchronous control is performed by preparing a table storing therein information in which a temperature change amount and a phase adjustment amount are associated with each other in order to prevent phase shifting due to a temperature change, and extracting a phase adjustment amount corresponding to the temperature change amount from the table by the second electric signal source 102. Alternatively, the second electric signal source 102 can receive a part of the optical signal output from the polarization-multiplexing dual-parallel Mach-Zehnder modulator 106, and perform phase adjustment so as to optimize the optical power, thereby performing synchronous control. As a method of optimizing the optical power, a low-frequency component can be superposed on an electric signal that drives the polarization-multiplexing dual-parallel Mach-Zehnder modulator 106, and a part of the optical signal output from the polarization-multiplexing dual-parallel Mach-Zehnder modulator 106 is received, to perform synchronous control based on the low-frequency component extracted from the received optical signal. The synchronous control method is not limited to those methods described above, and other methods can be used.

The synchronization timing is determined based on a pulse signal input to the Mach-Zehnder modulator 105. For example, the synchronization timing cannot be that in a state where the pulse rises from 0 to 1 or falls from 1 to 0 (hereinafter, "transition region") at the opposite ends of the pulse signal waveform, and the synchronization timing should be a center of the pulse signal waveform, which is not the transition region, and a state of being 1 or 0 in the vicinity thereof (hereinafter, "non-transition region"). When the non-transition region is set as the synchronization timing, the non-transition region of the pulse signal and a central portion of the QPSK optical signal output from the data modulation units 514-A and 514-B substantially match each other. When the transition region is used as the synchronization timing, the optical power in the central part of the data decreases excessively, thereby causing considerable performance deterioration.

Figure 3:
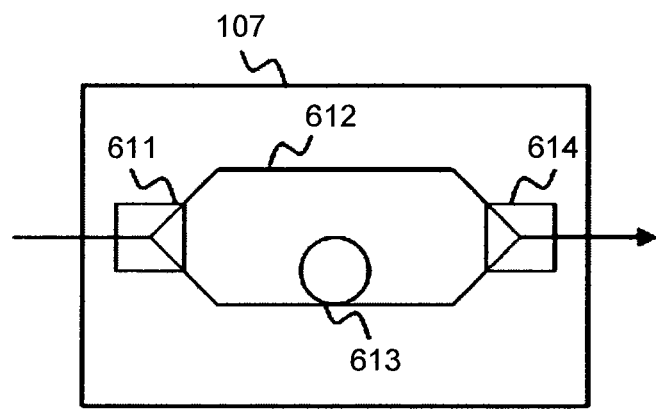
FIG. 3 is a configuration example of a polarization interleaver according to the first embodiment of the present invention.

FIG. 3 is a configuration example of the polarization interleaver 107 according to the present embodiment. As shown in FIG. 3, the polarization interleaver 107 includes a polarization branching unit 611, a non-delay unit 612, a delay unit 613, and a polarization coupling unit 614.

The polarization interleaver 107 provides a delay difference approximately corresponding to Ts/2 (=50 picoseconds) between an X-polarization optical signal and a Y-polarization optical signal of the polarization-multiplexed QPSK optical signal input from the polarization-multiplexing dual-parallel Mach-Zehnder modulator 106, to multiplex the respective polarization components. For example, a desired delay can be provided by causing the optical signal to pass through a birefringent medium such as a polarization maintaining fiber. The polarization interleaver 107 corresponds to an example of a polarization interleaving unit according to the present invention.

An operation of the polarization interleaver 107 in FIG. 3 is explained next. The polarization branching unit 611 branches the input polarization-multiplexed QPSK optical signal (for example, having an independent signal in each of X polarization and Y polarization) into an X-polarization optical signal and a Y-polarization optical signal, and outputs the X-polarization optical signal to the non-delay unit 612 and the Y-polarization optical signal to the delay unit 613. The non-delay unit 612 outputs the X-polarization optical signal input from the polarization branching unit 611 to the polarization coupling unit 614. The delay unit 613 provides a delay of Ts/2 (=50 picoseconds) to the Y-polarization optical signal input from the polarization branching unit 611 relative to the X-polarization optical signal passing through the non-delay unit 612, and outputs the Y-polarization optical signal provided with a delay to the polarization coupling unit 614. The polarization coupling unit 614 couples the X-polarization optical signal input from the non-delay unit 612 and the Y-polarization optical signal provided with the delay input from the delay unit 613, while maintaining the polarization state, and outputs the coupled signal to outside.

Figure 4:
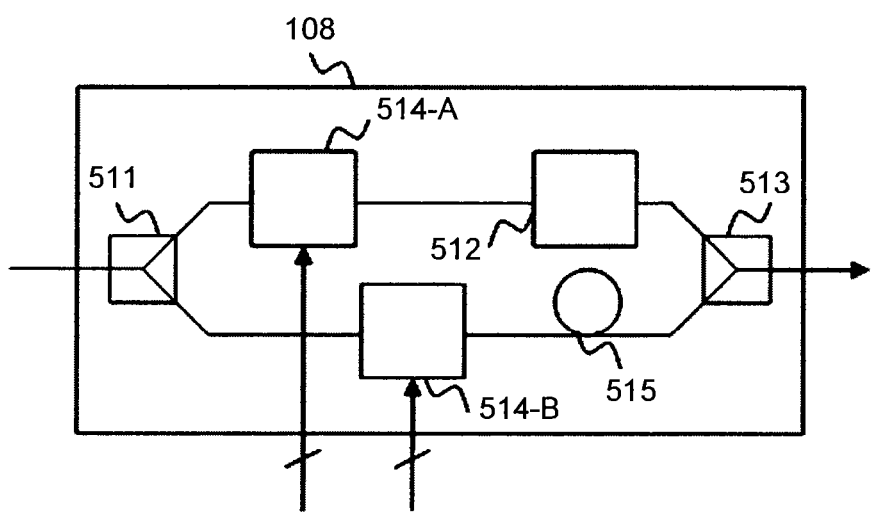
FIG. 4 is a configuration example of a polarization-multiplexing and interleaving modulator according to the first embodiment of the present invention.

Furthermore, such a configuration can be used that the polarization-multiplexing dual-parallel Mach-Zehnder modulator 106 and the polarization interleaver 107 are integrated. FIG. 4 is a configuration example of a polarization-multiplexing and interleaving modulator according to the present embodiment. A polarization-multiplexing and interleaving modulator 108 is provided with a delay unit 515 in addition to the configuration in FIG. 2.

An operation of the polarization-multiplexing and interleaving modulator 108 in FIG. 4 is explained next. Constituent elements having functions identical to those in FIG. 2 are denoted by like reference signs and redundant explanations thereof will be omitted. The delay unit 515 provides a delay of about Ts/2 (=50 picoseconds) to the optical signal input from the data modulation unit 514-B, and outputs the delayed optical signal to the optical coupling unit 513. Accordingly, a delay difference of Ts/2 (=50 picoseconds) is provided between the X-polarization optical signal acquired in a path passing through the data modulation unit 514-A and the Y-polarization optical signal acquired in a path passing through the data modulation unit 514-B.

Figure 5:
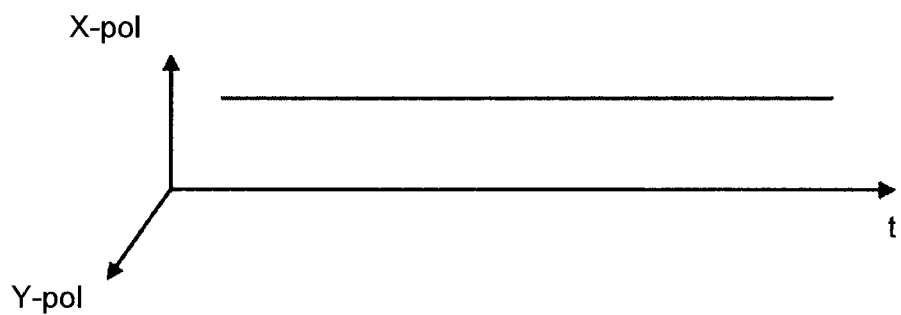
FIG. 5 is an example of a time waveform of CW light generated by an optical transmission unit according to the first embodiment of the present invention.
Figure 6:
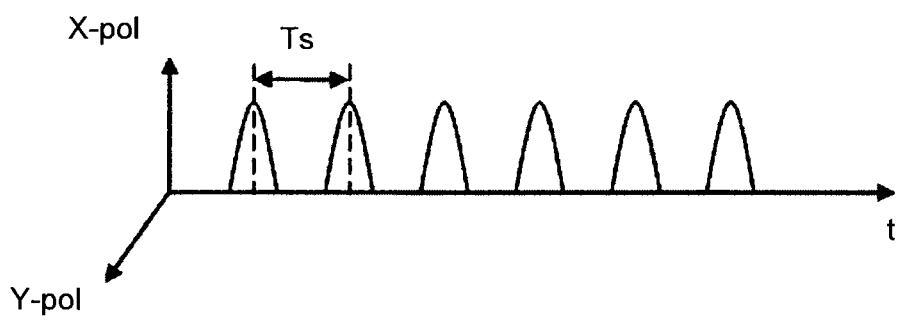
FIG. 6 is an example of a time waveform of a pulsed optical signal generated by the optical transmission unit according to the first embodiment of the present invention.
Figure 7:
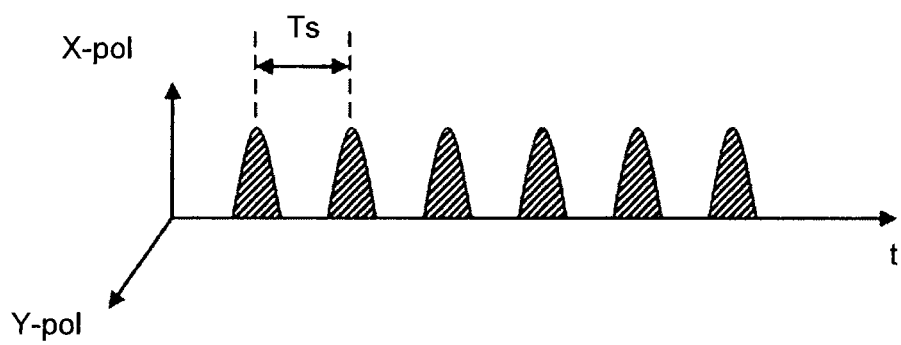
FIG. 7 is an example of a time waveform of an X-polarization pulsed QPSK optical signal generated by the optical transmission unit according to the first embodiment of the present invention.
Figure 8:
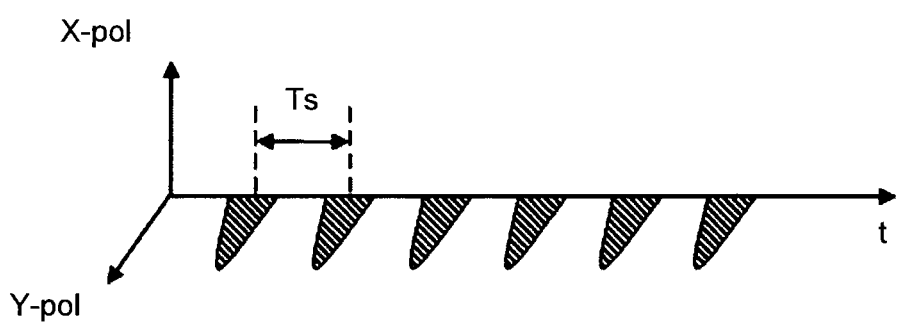
FIG. 8 is an example of a time waveform of a Y-polarization pulsed QPSK optical signal generated by the optical transmission unit according to the first embodiment of the present invention.
Figure 9:
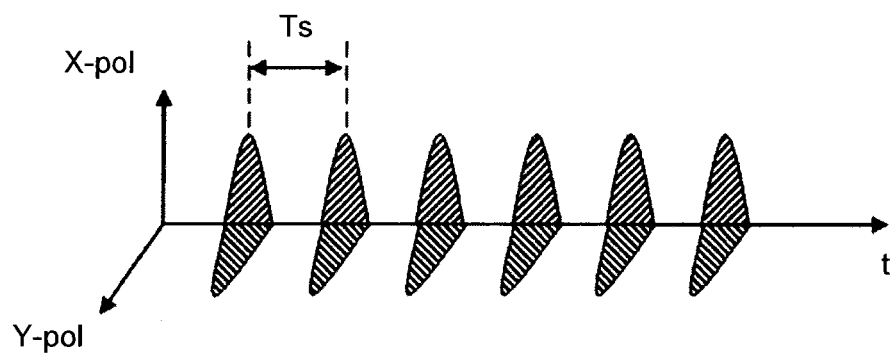
FIG. 9 is an example of a time waveform of a polarization-multiplexed QPSK optical signal generated by the optical transmission unit according to the first embodiment of the present invention.

FIG. 5 to 10 depict a change in a time waveform of an optical signal generated by the optical transmission unit 100 according to the present embodiment. FIG. 5 depicts a time waveform of CW light output from the light source 104. The CW light is pulse-modulated by the Mach-Zehnder modulator 105, to change to a pulsed optical signal shown in FIG. 6. The X-polarization optical signal and the Y-polarization optical signal of the pulsed optical signal are respectively QPSK-modulated by the polarization-multiplexing dual-parallel Mach-Zehnder modulator 106 to change to QPSK optical signals shown in FIGS. 7 and 8, which are then polarization-multiplexed to change to a polarization-multiplexed QPSK optical signal shown in FIG. 9. The polarization-multiplexed QPSK optical signal is polarization-interleaved by the polarization interleaver 107, to change to a polarization-multiplexed and interleaved QPSK optical signal shown in FIG. 10.

Figure 10:
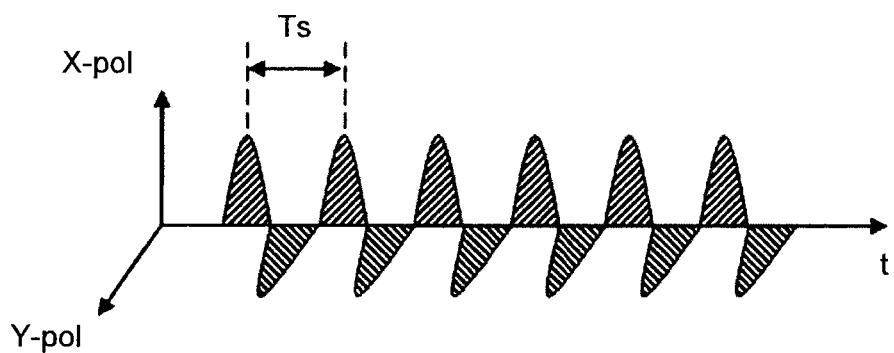
FIG. 10 is an example of a time waveform of a polarization-multiplexed and interleaved QPSK optical signal generated by the optical transmission unit according to the first embodiment of the present invention.

The polarization-multiplexed and interleaved QPSK optical signal shown in FIG. 10 is such that independent signal components Ex and Ey are respectively allocated to an X-polarization component and a Y-polarization component orthogonal to each other, a time at which Ex and Ey are simultaneously present on the time axis is substantially zero, Ex and Ey are alternately present on the time axis, and the cycle in which Ex and Ey are present becomes Ts, respectively. When the bit rate is designated as B, and a multi-value degree of the modulation method is designated as m, the symbol repetition cycle Ts is expressed by m/B. An overlapping state of Ex and Ey on the time axis is such that the time at which Ex and Ey are simultaneously present on the time axis is substantially zero. That is, it is ideal that the time at which Ex and Ey are simultaneously present is zero; however, it is allowed if overlapping of Ex and Ey to an extent permissible to the required transfer signal quality occurs.

The polarization-multiplexed and interleaved optical signal output from the polarization interleaver 107 passes through the optical transfer unit 200 and reaches the optical 90-degree hybrid 302 in the optical reception unit 300.

The local oscillation light source 301 generates CW light having a central wavelength substantially matching with that of the transferred optical signal, and outputs the CW light to the optical 90-degree hybrid 302. The optical 90-degree hybrid 302 causes an interference between the transferred optical signal input from the optical transfer unit 200 and the CW light input from the local oscillation light source 301 to generate eight components determined by aggregate components and difference components of I'-axis components and Q'-axis components of the X'-polarization component and the Y'-polarization component, and outputs respective components to the balanced photoelectric convertors 303-A, 303-B, 303-C, and 303-D. For example, aggregate components and difference components of X'-polarization/I'-axis are output to the balanced photoelectric convertors 303-A, aggregate components and difference components of X'-polarization/Q'-axis are output to the balanced photoelectric convertors 303-B, aggregate components and difference components of Y'-polarization/I'-axis are output to the balanced photoelectric convertors 303-C, and aggregate components and difference components of Y'-polarization/Q'-axis are output to the balanced photoelectric convertors 303-D. The present invention is not limited to these correspondence relations.

Generally, the X'-polarization component and the Y'-polarization component do not match the X-polarization component and the Y-polarization component at an output point of the optical transmission unit 100, due to an influence of a change in the polarization state and a phase change in the optical transfer unit 200. Similarly, the I'-axis component and the Q'-axis component do not generally match the I-axis component and the Q-axis component at an output point of the transmitter. The optical 90-degree hybrid 302 corresponds to an example of an optical interference unit according to the present invention.

The balanced photoelectric convertor 303-A photoelectrically converts the aggregate component and the difference component of the interfered optical signal input from the optical 90-degree hybrid 302, and outputs an X'-polarization/I'-axis electric signal to the analog-digital convertor 401-A. The balanced photoelectric convertor 303-B photoelectrically converts the aggregate component and the difference component of the interfered optical signal input from the optical 90-degree hybrid 302, and outputs an X'-polarization/Q'-axis electric signal to the analog-digital convertor 401-B. The balanced photoelectric convertor 303-C photoelectrically converts the aggregate component and the difference component of the interfered optical signal input from the optical 90-degree hybrid 302, and outputs a Y'-polarization/I'-axis electric signal to the analog-digital convertor 401-C. The balanced photoelectric convertor 303-D photoelectrically converts the aggregate component and the difference component of the interfered optical signal input from the optical 90-degree hybrid 302, and outputs a Y'-polarization/Q'-axis electric signal to the analog-digital convertor 401-D. The balanced photoelectric convertors 303-A, 303-B, 303-C, and 303-D can be realized by, for example, a combination of a photodetector and a transimpedance amplifier. These balanced photoelectric convertors correspond to an example of a photoelectric conversion unit according to the present invention.

The analog-digital convertor 401-A converts the X'-polarization/I'-axis electric signal input from the balanced photoelectric convertor 303-A into a digital signal, and outputs the digital signal to the digital-signal processing unit 402. The analog-digital convertor 401-B converts the X'-polarization/Q'-axis electric signal input from the balanced photoelectric convertor 303-B into a digital signal, and outputs the digital signal to the digital-signal processing unit 402. The analog-digital convertor 401-C converts the Y'-polarization/I'-axis electric signal input from the balanced photoelectric convertor 303-C into a digital signal, and outputs the digital signal to the digital-signal processing unit 402. The analog-digital convertor 401-D converts the Y'-polarization/Q'-axis electric signal input from the balanced photoelectric convertor 303-D into a digital signal, and outputs the digital signal to the digital-signal processing unit 402. In the analog-digital conversion, both of discrete time implementation of continuous time signals and quantization of an amplitude level are performed. A ratio of a sampling speed due to discrete time implementation to the symbol rate is set to 1 Sample/symbol or higher, and is generally set to 2 Samples/symbol. The analog-digital convertors 401-A, 401-B, 401-C, and 401-D correspond to an example of an analog-digital conversion unit according to the present invention.

Figure 11:
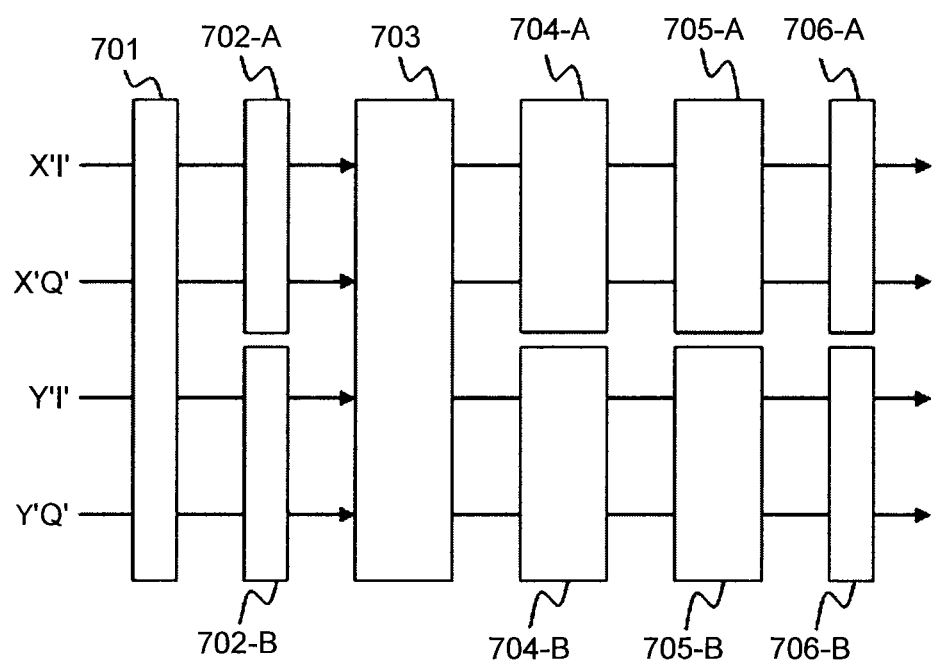
FIG. 11 is a configuration example of a digital-signal processing unit according to the first embodiment of the present invention.

The digital-signal processing unit 402 performs received electric signal processing based on the respective digital signals input from the analog-digital convertors 401-A, 401-B, 401-C, and 401-D. FIG. 11 is a configuration example of the digital-signal processing unit according to the present embodiment of the present invention. As shown in FIG. 11, the digital-signal processing unit 402 includes a fixed-skew adjustment unit 701, wavelength-dispersion compensation units 702-A and 702-B, a polarization restoration unit 703, carrier-wave frequency-offset compensation units 704-A and 704-B, carrier-wave phase-offset compensation units 705-A and 705-B, and identification units 706-A and 706-B. The digital-signal processing unit 402 can be realized by a digital signal processing device such as a digital signal processor, an FPGA (Field Programmable Gate Array), or an ASIC (Application Specific Integrated Circuit).

An operation of the digital-signal processing unit 402 in FIG. 11 is explained next. The fixed-skew adjustment unit 701 adjusts a fixed delay difference being present in an optical/electric circuit in the optical transfer system with respect to an X'-polarization/I'-axis digital signal, an X'-polarization/Q'-axis digital signal, a Y'-polarization/I'-axis digital signal, and a Y'-polarization/Q'-axis digital signal input from outside, and generates digital data having an equal delay. The fixed-skew adjustment unit 701 outputs an X'-polarization component with the delay being adjusted to the wavelength-dispersion compensation unit 702-A, and outputs a Y'-polarization component with the delay being adjusted to the wavelength-dispersion compensation unit 702-B.

The wavelength-dispersion compensation unit 702-A compensates wavelength dispersion occurring in a transfer process with respect to the X'-polarization/I'-axis digital data and the X'-polarization/Q'-axis digital data input from the fixed-skew adjustment unit 701, and outputs the X'-polarization/I'-axis digital data and the X'-polarization/Q'-axis digital data with the wavelength dispersion being compensated to the polarization restoration unit 703. The wavelength-dispersion compensation unit 702-B compensates wavelength dispersion occurring in the transfer process with respect to the Y'-polarization/I'-axis digital data and the Y'-polarization/Q'-axis digital data input from the fixed-skew adjustment unit 701, and outputs the Y'-polarization/I'-axis digital data and the Y'-polarization/Q'-axis digital data with the wavelength dispersion being compensated to the polarization restoration unit 703.

For example, the wavelength-dispersion compensation units 702-A and 702-B perform frequency domain equalization and time domain equalization by a finite impulse response (FIR) filter. In the case of a waveform distortion having a long fluctuation cycle, a waveform distortion other than wavelength dispersion can be equalized.

The polarization restoration unit 703 restores the original X-polarization signal and Y-polarization signal based on the X'-polarization/I'-axis digital data and the X'-polarization/Q'-axis digital data input from the wavelength-dispersion compensation unit 702-A and the Y'-polarization/I'-axis digital data and the Y'-polarization/Q'-axis digital data input from the wavelength-dispersion compensation unit 702-B, and de-interleaves the polarization components interleaved in the optical transmission unit 100. The polarization restoration unit 703 equalizes at least a part of the remaining wavelength dispersion, which has not been compensated by the wavelength-dispersion compensation units 702-A and 702-B, PMD generated in the transfer process, and deterioration due to bandwidth shortage in the respective devices. The processed X-polarization component is output to the carrier-wave frequency-offset compensation unit 704-A, and the processed Y-polarization component to the carrier-wave frequency-offset compensation unit 704-B.

For example, the process by the polarization restoration unit 703 can be collectively realized by a butterfly FIR filter described in Non Patent Literature 1. PMD equal to Ts/2 (=50 picoseconds) or more can be compensated by setting a tap length n of the butterfly FIR filter to be equal to or longer than several symbols. Because polarization interleaving is substantially equal to generation of a fixed DGD (Differential Group Delay) of about Ts/2 (=50 picoseconds), if the PMD equal to Ts/2 (=50 picoseconds) or more can be compensated, the polarization restoration unit 703 can demodulate signals without any problem. The polarization restoration unit 703 recognizes that PMD of Ts/2 is included beforehand in the digital data to be processed, and performs elimination of the delay difference of Ts/2 between the respective polarized signal components and adaptive equalization of a distortion other than the delay difference.

Figure 12:
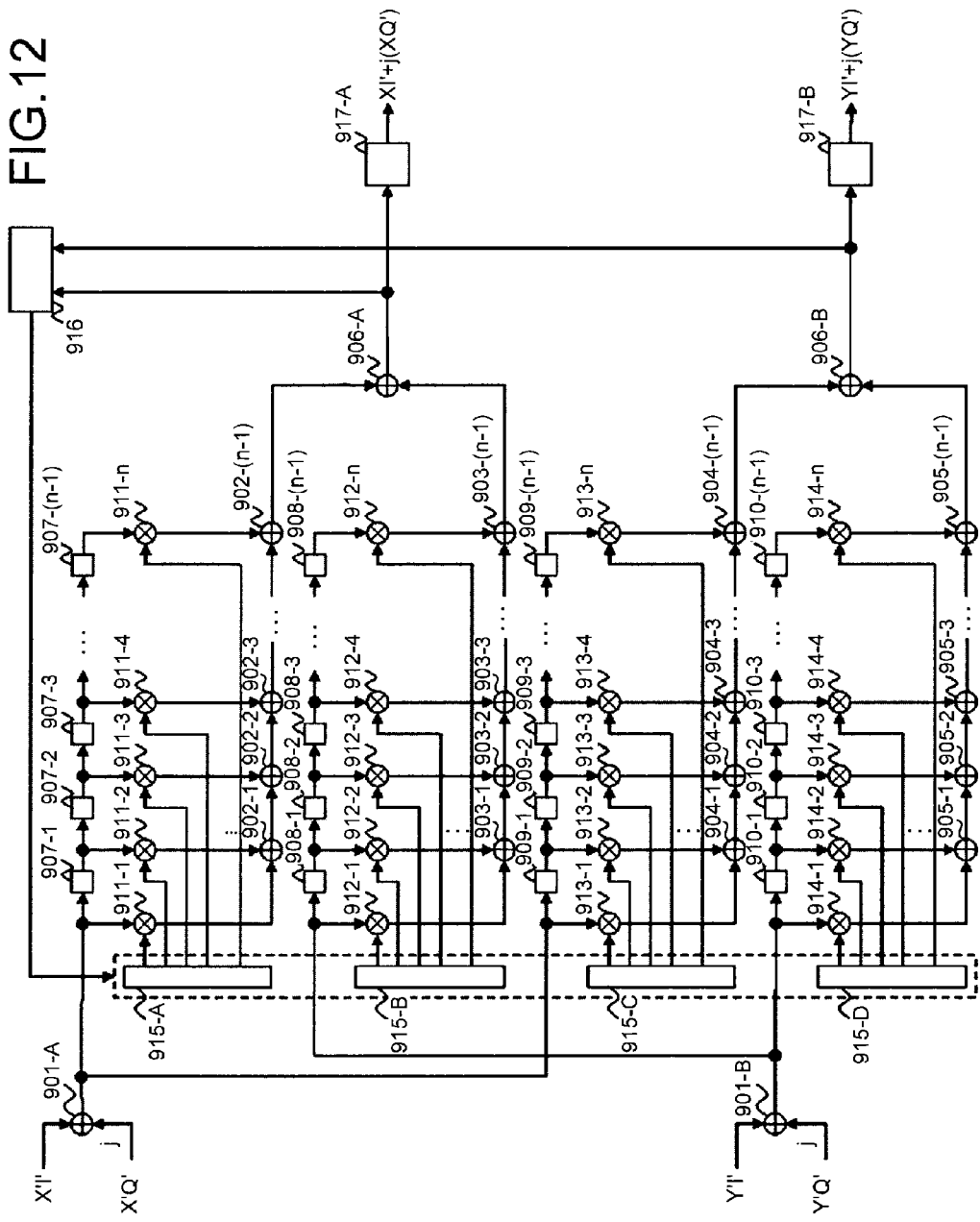
FIG. 12 is a configuration example of a polarization restoration unit according to the first embodiment of the present invention.

FIG. 12 is a configuration example of the polarization restoration unit according to the present embodiment. As shown in FIG. 12, an example of using a butterfly FIR filter as an example of the polarization restoration unit 703 is explained. The butterfly FIR filter includes complex-signal generation units 901-A and 901-B, complex adders 902-1, 902-2, 902-3, . . . , 902-(n−1), 903-1, 903-2, 903-3, . . . , 903-(n−1), 904-1, 904-2, 904-3, . . . , 904-(n−1), 905-1, 905-2, 905-3, . . . , 905-(n−1), 906-A, and 906-B, delay units 907-1, 907-2, 907-3, . . . , 907-(n−1), 908-1, 908-2, 908-3, . . . , 908-(n−1), 909-1, 909-2, 909-3, . . . , 909-(n−1), and 910-1, 910-2, 910-3, . . . , 910-(n−1), complex multipliers 911-1, 911-2, 911-3, 911-4 . . . , 911-n, 912-1, 912-2, 912-3, 912-4 . . . , 912-n, 913-1, 913-2, 913-3, 913-4 . . . , 913-n, and 914-1, 914-2, 914-3, 914-4 . . . , 914-n, tap-coefficient holding units 915-A, 915-B, 915-C, and 915-D, a tap-coefficient generation unit 916, and output-data selection units 917-A and 917-B. In the above explanation, n is a natural number, and this also applies to the following explanations.

The complex-signal generation unit 901-A generates a complex number in which the X'-polarization/I'-axis digital data input from outside is designated as a real part, and the X'-polarization/Q'-axis digital data input from outside is designated as an imaginary part, and outputs the complex number to each of the complex multipliers 911-1 and 913-1 and the delay units 907-1 and 909-1. The complex-signal generation unit 901-B generates a complex number in which the Y'-polarization/I'-axis digital data input from outside is designated as a real part, and the Y'-polarization/Q'-axis digital data input from outside is designated as an imaginary part, and outputs the digital data to each of the complex multipliers 912-1 and 914-1 and the delay units 908-1 and 910-1.

The delay unit 907-1 holds the digital data input from the complex-signal generation unit 901-A for a predetermined time τ, and outputs the digital data to the complex multiplier 911-2 and the delay unit 907-2 after the time τ has passed. The delay unit 908-1 holds the digital data input from the complex-signal generation unit 901-B for the predetermined time τ, and outputs the digital data to the complex multiplier 912-2 and the delay unit 908-2 after the time τ has passed. The delay unit 909-1 holds the digital data input from the complex-signal generation unit 901-A for the predetermined time τ, and outputs the digital data to the complex multiplier 913-2 and the delay unit 909-2 after the time τ has passed. The delay unit 910-1 holds the digital data input from the complex-signal generation unit 901-B for the predetermined time τ, and outputs the digital data to the complex multiplier 914-2 and the delay unit 910-2 after the time τ has passed.

The delay unit 907-$k$ ($k$=2, 3, . . . , n−2) holds the digital data input from the delay unit 907-($k$−1) for the predetermined time τ, and outputs the digital data to the complex multiplier 911-($k$+1) and the delay unit 907-($k$+1) after the time τ has passed. The delay unit 908-$k$ ($k$=2, 3, . . . , n−2) holds the digital data input from the delay unit 908-($k$−1) for the predetermined time τ, and outputs the digital data to the complex multiplier 912-($k$+1) and the delay unit 908-($k$+1) after the time τ has passed. The delay unit 909-$k$ ($k$=2, 3, . . . , n−2) holds the digital data input from the delay unit 909-($k$−1) for the predetermined time τ, and outputs the digital data to the complex multiplier 913-($k$+1) and the delay unit 909-($k$+1) after the time τ has passed. The delay unit 910-$k$ ($k$=2, 3, . . . , n−2) holds the digital data input from the delay unit 910-($k$−1) for the predetermined time τ, and outputs the digital data to the complex multiplier 914-($k$+1) and the delay unit 910-($k$+1) after the time τ has passed.

The delay unit 907-($n$−1) holds the digital data input from the delay unit 907-($n$−2) for the predetermined time τ, and outputs the digital data to the complex multiplier 911-$n$ after the time τ has passed. The delay unit 908-($n$−1) holds the digital data input from the delay unit 908-($n$−2) for the predetermined time τ, and outputs the digital data to the complex multiplier 912-$n$ after the time τ has passed. The delay unit 909-($n$−1) holds the digital data input from the delay unit 909-($n$−2) for the predetermined time τ, and outputs the digital data to the complex multiplier 913-$n$ after the time τ has passed. The delay unit 910-($n$−1) holds the digital data input from the delay unit 910-($n$−2) for the predetermined time τ, and outputs the digital data to the complex multiplier 914-$n$ after the time τ has passed.

The complex multiplier 911-1 performs complex multiplication of the digital data input from the complex-signal generation unit 901-A and a tap coefficient input from the tap-coefficient holding unit 915-A, and outputs a computation result to the complex adder 902-1. The complex multiplier 912-1 performs complex multiplication of the digital data input from the complex-signal generation unit 901-B and a tap coefficient input from the tap-coefficient holding unit 915-B, and outputs a computation result to the complex adder 903-1. The complex multiplier 913-1 performs complex multiplication of the digital data input from the complex-signal generation unit 901-A and a tap coefficient input from the tap-coefficient holding unit 915-C, and outputs a computation result to the complex adder 904-1. The complex multiplier 914-1 performs complex multiplication of the digital data input from the complex-signal generation unit 901-B and a tap coefficient input from the tap-coefficient holding unit 915-D, and outputs a computation result to the complex adder 905-1.

The complex multiplier 911-$k$ ($k$=2, 3, . . . , n) performs complex multiplication of the digital data input from the delay unit 907-($k$−1) and the tap coefficient input from the tap-coefficient holding unit 915-A, and outputs a computation result to the complex adder 902-($k$−1). The complex multiplier 912-$k$ ($k$=2, 3, . . . , n) performs complex multiplication of the digital data input from the delay unit 908-($k$−1) and the tap coefficient input from the tap-coefficient holding unit 915-B, and outputs a computation result to the complex adder 903-($k$−1). The complex multiplier 913-$k$ ($k$=2, 3, . . . , n) performs complex multiplication of the digital data input from the delay unit 909-($k$−1) and the tap coefficient input from the tap-coefficient holding unit 915-C, and outputs a computation result to the complex adder 904-($k$−1). The complex multiplier 914-$k$ ($k$=2, 3, . . . , n) performs complex multiplication of the digital data input from the delay unit 910-($k$−1) and the tap coefficient input from the tap-coefficient holding unit 915-D, and outputs a computation result to the complex adder 905-($k$−1).

The complex adder 902-1 performs complex addition of the digital data input from the complex multiplier 911-1 and the digital data input from the complex multiplier 911-2, and outputs a computation result to the complex adder 902-2. The complex adder 903-1 performs complex addition of the digital data input from the complex multiplier 912-1 and the digital data input from the complex multiplier 912-2, and outputs a computation result to the complex adder 903-2. The complex adder 904-1 performs complex addition of the digital data input from the complex multiplier 913-1 and the digital data input from the complex multiplier 913-2, and outputs a computation result to the complex adder 904-2. The complex adder 905-1 performs complex addition of the digital data input from the complex multiplier 914-1 and the digital data input from the complex multiplier 914-2, and outputs a computation result to the complex adder 905-2.

The complex adder 902-$k$ ($k$=2, 3, . . . , n−2) performs complex addition of the digital data input from the complex adder 902-($k$−1) and the digital data input from the complex multiplier 911-($k$+1), and outputs a computation result to the complex adder 902-($k$+1). The complex adder 903-$k$ ($k$=2, 3, . . . , n−2) performs complex addition of the digital data input from the complex adder 903-($k$−1) and the digital data input from the complex multiplier 912-($k$+1), and outputs a computation result to the complex adder 903-($k$+1). The complex adder 904-$k$ ($k$=2, 3, . . . , n−2) performs complex addition of the digital data input from the complex adder 904-($k$−1) and the digital data input from the complex multiplier 913-($k$+1), and outputs a computation result to the complex adder 904-($k$+1). The complex adder 905-$k$ ($k$=2, 3, . . . , n−2) performs complex addition of the digital data input from the complex adder 905-($k$−1) and the digital data input from the complex multiplier 914-($k$+1), and outputs a computation result to the complex adder 905-($k$+1).

The complex adder 902-($n$−1) performs complex addition of the digital data input from the complex adder 902-($n$−2) and the digital data input from the complex multiplier 911-$n$, and outputs a computation result to the complex adder 906-A. The complex adder 903-($n$−1) performs complex addition of the digital data input from the complex adder 903-($n$−2) and the digital data input from the complex multiplier 912-$n$, and outputs a computation result to the complex adder 906-A. The complex adder 904-($n$−1) performs complex addition of the digital data input from the complex adder 904-($n$−2) and the digital data input from the complex multiplier 913-$n$, and outputs a computation result to the complex adder 906-B. The complex adder 905-($n$−1) performs complex addition of the digital data input from the complex adder 905-($n$−2) and the digital data input from the complex multiplier 914-$n$, and outputs a computation result to the complex adder 906-B.

The complex adder 906-A performs complex addition of the digital data input from the complex adder 902-($n$−1) and the digital data input from the complex adder 903-($n$−1), and outputs a computation result to the tap-coefficient generation unit 916 and the output-data selection unit 917-A. The complex adder 906-B performs complex addition of the digital data input from the complex adder 904-($n-1$) and the digital data input from the complex adder 905-($n-1$), and outputs a computation result to the tap-coefficient generation unit 916 and the output-data selection unit 917-B.

For example, the tap-coefficient generation unit 916 applies a constant modulus algorithm (CMA) or a decision-directed LMS (Least Mean Square) algorithm to the digital data input from the complex adder 906-A and the digital data input from the complex adder 906-B, sequentially updates the tap coefficient, and outputs the updated tap coefficient to each of the tap-coefficient holding units 915-A, 915-B, 915-C, and 915-D. Because output signals from the complex adders 906-A and 906-B may be converged to the same polarization component due to miscapturing of the CMA, the tap-coefficient generation unit 916 monitors a correlation value of the input signals from the complex adders 906-A and 906-B and set the tap coefficient so that the respective signals are independent. The tap coefficient is generally a complex number. The tap-coefficient generation unit 916 outputs a component of the X'-polarization component corresponding to the X-polarization component to the tap-coefficient holding unit 915-A, a component of the X'-polarization component corresponding to the Y-polarization component to the tap-coefficient holding unit 915-C, a component of the Y'-polarization component corresponding to the X-polarization component to the tap-coefficient holding unit 915-B, and a component of the Y'-polarization component corresponding to the Y-polarization component to the tap-coefficient holding unit 915-D.

The tap-coefficient holding unit 915-A holds the tap coefficient input from the tap-coefficient generation unit 916, and outputs the tap coefficient to the complex multipliers 911-1, 911-2, 911-3, ..., and 911-$n$. The tap coefficients to be output to the respective complex multipliers generally have different values. The tap-coefficient holding unit 915-B holds the tap coefficient input from the tap-coefficient generation unit 916, and outputs the tap coefficient to the complex multipliers 912-1, 912-2, 912-3, ..., and 912-$n$. The tap coefficients to be output to the respective complex multipliers generally have different values. The tap-coefficient holding unit 915-C holds the tap coefficient input from the tap-coefficient generation unit 916, and outputs the tap coefficient to the complex multipliers 913-1, 913-2, 913-3, ..., and 913-$n$. The tap coefficients to be output to the respective complex multipliers generally have different values. The tap-coefficient holding unit 915-D holds the tap coefficient input from the tap-coefficient generation unit 916, and outputs the tap coefficient to the complex multipliers 914-1, 914-2, 911-3, ..., and 914-$n$. The tap coefficients to be output to the respective complex multipliers generally have different values.

The output-data selection unit 917-A selects the data input from the complex adder 906-A, and outputs the selected data signal to outside as an X-polarization signal. The output-data selection unit 917-B selects the data input from the complex adder 906-B, and outputs the selected data signal to outside (not shown) as a Y-polarization signal. It is assumed here that the digital data having a sampling speed ratio of 1 Sample/symbol is output to outside. However, the present invention does not pose any limitation to the sampling speed ratio.

It is assumed that the delay amount $\tau$ of the delay units 907-$k$, 908-$k$, 909-$k$, 910-$k$ ($k=1, 2, \ldots, n-1$) is expressed as $\tau=T_s/p$ by using the symbol repetition cycle $T_s$. When $p=1$, the output-data selection units 917-A and 917-B select and output all the pieces of input data. When $p>1$, the output-data selection units 917-A and 917-B set the sampling speed to $1/p$, that is, perform rate-conversion on the sampling speed ratio to 1 Sample/symbol, and then output the data.

At the time of the rate-conversion of the sampling speed ratio to 1/p by the output-data selection units 917-A and 917-B, there can be cases of outputting data at the same time point and outputting data at the different time points. For example, when it is assumed that p=2 and an input data column e'xin to the output-data selection unit 917-A and an input data column e'yin to the output-data selection unit 917-B are respectively expressed as:

$$e'xin = e'x00, e'x01, e'x10, e'x11, \ldots, e'xk0, e'xk1, \quad (4)$$

$$e'yin = e'y00, e'y01, e'y10, e'y11, \ldots, e'yk0, e'yk1, \quad (5),$$

for an output data column e'xout from the output-data selection unit 917-A and an output data column e'yout from the output-data selection unit 917-B, there can be assumed a case of outputting data at the same time point such as $$e'xout = e'x00, e'x10, \ldots, e'xk0, \quad (6)$$

and $$e'yout = e'y00, e'y10, \ldots, e'yk0, \quad (7)$$

and a case of outputting data at the different time points such as $$e'xout = e'x00, e'x10, \ldots e'xk0, \quad (8)$$

and $$e'yout = e'y01, e'y11, \ldots, e'yk1, \quad (9).$$

As in the present embodiment, when the optical transmission unit provides a delay difference of $T_s/2$ between X polarization and Y polarization, it is desired to process the data in a similar form to the equation (9) rather than the equation (8). This is because if the tap-coefficient generation unit 916 generates the tap coefficient so that a DGD of $T_s/2$ remains between X polarization and Y polarization, and the output-data selection units 917-A and 917-B compensate the remaining DGD of $T_s/2$, the equalization capacity of a butterfly FIR do not need to be allocated for the known DGD compensation. When p=2, a method of generating and updating the tap coefficient so that a DGD of $T_s/2$ remains is explained below.

Generally, when polarization restoration is performed by using the CMA, a target value of an envelope curve is set to a (>0), and the tap coefficient is updated so that an envelope value of an X-polarization output signal and an envelope value of a Y-polarization output signal always approach to a.

$$(\text{Envelope target value of } X \text{ polarization}) = a \quad (10)$$

$$(\text{Envelope target value of } Y \text{ polarization}) = a \quad (11)$$

When polarization restoration is performed with respect to a pulsed signal, for example, the envelope target value can be set as in the following equations (generally, $a \neq b$, $a > 0$, $b > 0$).

$$(\text{Envelope target value of } X \text{ polarization at } m=2n) = a \quad (12),$$

$$(\text{Envelope target value of } X \text{ polarization at } m=2n+1) = b \quad (13),$$

$$(\text{Envelope target value of } Y \text{ polarization at } m=2n)=a \\ (t=2tk) \quad (14),$$

and $$(\text{Envelope target value of } Y \text{ polarization at } m=2n+1) = b(t=2tk+1) \quad (15),$$

where m and n are integers, and m denotes a discrete time number. When m=2n is a timing at the pulse center and m=2n+1 is an intermediate timing between pulses, there can be considered a method of setting the envelope target value so that a=1 and b=0, or a method of setting the envelope target value so that a=1 and b=½.

The setting methods of the envelope target value described in the equations (12) to (15) are tap-coefficient generating and updating methods when the DGD of Ts/2 is also equalized by a butterfly FIR. To intentionally leave the DGD of Ts/2 as it is, the equations (10) to (15) can be corrected as the following equations (16) to (19).

(Envelope target value of X polarization at $m=2n$)=$a$ $(t=2tk)$     (16), (Envelope target value of X polarization in $m=2n+1$)=$b(t=2tk+1)$     (17), (Envelope target value of Y polarization at $m=2n$)=$b$ $(t=2tk)$     (18), and (Envelope target value of Y polarization at $m=2n+1$)=$a(t=2tk+1)$     (19).

When the DGD of Ts/2 is left as it is, a pulse center point of X polarization (m=2n) corresponds to an intermediate point between Y-polarization pulses, and a pulse center point of Y polarization (m=2n+1) corresponds to an intermediate point between X-polarization pulses.

The carrier-wave frequency-offset compensation unit 704-A performs center-frequency offset compensation between local oscillation light and received signal light based on X-polarization/I'-axis digital data and X-polarization/Q'-axis digital data input from the polarization restoration unit 703, and outputs the compensated X-polarization/I'-axis digital data and X-polarization/Q'-axis digital data to the carrier-wave phase-offset compensation unit 705-A. The carrier-wave frequency-offset compensation unit 704-B performs center-frequency offset compensation between local oscillation light and received signal light based on Y-polarization/I'-axis digital data and Y-polarization/Q'-axis digital data input from the polarization restoration unit 703, and outputs the compensated Y-polarization/I'-axis digital data and Y-polarization/Q'-axis digital data to the carrier-wave phase-offset compensation unit 705-B.

The carrier-wave phase-offset compensation unit 705-A performs phase-offset compensation of signal light based on the X-polarization/I'-axis digital data and the X-polarization/Q'-axis digital data input from the carrier-wave frequency-offset compensation unit 704-A to restore the I-axis and the Q-axis, and outputs the compensated X-polarization/I-axis digital data and X-polarization/Q-axis digital data to the identification unit 706-A. The carrier-wave phase-offset compensation unit 705-B performs phase-offset compensation of signal light based on the Y-polarization/I'-axis digital data and Y-polarization/Q'-axis digital data input from the carrier-wave frequency-offset compensation unit 704-B to restore the I-axis and the Q-axis, and outputs the compensated Y-polarization/I-axis digital data and Y-polarization/Q-axis digital data to the identification unit 706-B.

The identification unit 706-A identifies X-polarization/I-axis and Q-axis signals based on the X-polarization/I-axis digital data and the X-polarization/Q-axis digital data input from the carrier-wave phase-offset compensation unit 705-B, and outputs the identified data to outside. The identification unit 706-B identifies Y-polarization/I-axis and Q-axis signals based on the Y-polarization/I-axis digital data and the Y-polarization/Q-axis digital data input from the carrier-wave phase-offset compensation unit 705-A, and outputs the identified data to outside.

In the above descriptions, such an example has been explained that CW light is output from the local oscillation light source 301, and the CW light and the transferred signal light interfere with each other. However, it also suffices that pulsed light, instead of the CW light, and the transferred signal light interfere with each other.

In the above descriptions, the QPSK has been explained as the data modulation method. However, it is needless to mention that the present invention can be also applied to other modulation methods such as BPSK and 16 QAM, and a case where pre-equalization or differential coding is performed.

Furthermore, to optimize the transfer performance, it is essential to optimize bandwidth limitations in each portion of the optical transmission unit 100, the optical transfer unit 200, the optical reception unit 300, and the received electric-signal processing unit 400. As can be understood from a comparison between FIGS. 10, 17 and FIGS. 23, 24, an optical signal output from the polarization interleaver 107 has half a pulse width in the conventional case and twice a frequency spectral width in the conventional case. For example, the bandwidth of the electric circuit incorporated in the balanced photoelectric convertors 303-A, 303-B, 303-C, and 303-D is generally set such that a 3-dB bandwidth is set to 0.5 fs to 1.0 fs with respect to the symbol repetition frequency fs of the data signal. In the present embodiment, if bandwidth limitations are not performed so as to change the signal frequency spectrum on an upstream side of the balanced photoelectric convertors 303-A, 303-B, 303-C, and 303-D, the balanced photoelectric convertors 303-A, 303-B, 303-C, and 303-D receive a signal having twice a normal spectral width. At this time, it is assumed that if the 3-dB bandwidth of the electric circuit incorporated in the balanced photoelectric convertors 303-A, 303-B, 303-C, and 303-D is 0.5 fs, it may be rather too small. In some cases, a condition exceeding the fs may be optimum, and thus bandwidth optimization of the reception circuit is particularly important. For example, it is realized by optimizing the bandwidth of the balanced photoelectric convertors at the time of startup of the optical transfer system so that symbol error rates after processing of the received electric signal becomes minimum, and at the time of operating, performing periodic monitoring of the transfer quality and monitoring of bandwidth optimization, and updating the setting so as to be optimum at all times.

It is also possible to narrow the bandwidth by using single sideband (SSB) modulation or vestigial sideband (VSB) modulation together. Furthermore, at the time of narrowing the bandwidth by the optical multiplexer/demultiplexer provided in the optical transfer unit 200, in 20 Gbit/s modulation, that is, in the general double sideband (DSB) modulation, the bandwidth is strictly narrowed, for example, to a passband width equal to or less than 50 gigahertz (2.5 times the symbol rate or less) with respect to the bandwidth corresponding to 40 gigahertz and the central frequency of the bandwidth narrowing is shifted from the central frequency of the signal light, thereby enabling to receive the signal after changing the modulation to the VSB modulation in a pseudo manner. However, to maintain the performance without any complicating digital signal processing in the receiver, at least a passband of 10 gigahertz (corresponding to 0.5 times the symbol rate) is required. By narrowing the bandwidth, wavelength multiplexing is performed densely, thereby enabling to realize high frequency use efficiency.

As described above, in the present embodiment, the optical transmission unit 100 generates an optical signal in which respective polarization components are alternately present on the time axis, a time at which the respective polarization components are simultaneously present on the time axis is substantially zero, and the symbol repetition cycle of optical signals of the respective polarization components becomes Ts. The optical reception unit 300 causes an interference between the local oscillation light and the received optical signal, and converts the interfered optical signal to an electric signal. The received electric-signal processing unit 400 performs analog-digital conversion of the electric signal, elimination of the delay difference of Ts/2 between the respective polarized signal components, and adaptive equalization of a distortion other than the delay difference. Accordingly, deterioration of the transfer quality due to the nonlinear interference occurring between the orthogonal polarization-multiplexed signals can be reduced, and the transfer quality can be improved.

Second Embodiment

A second embodiment of the present invention has a configuration using CSRZ (Carrier Suppressed Return to Zero) modulation for the pulse modulation in the first embodiment described above.

Figure 13:
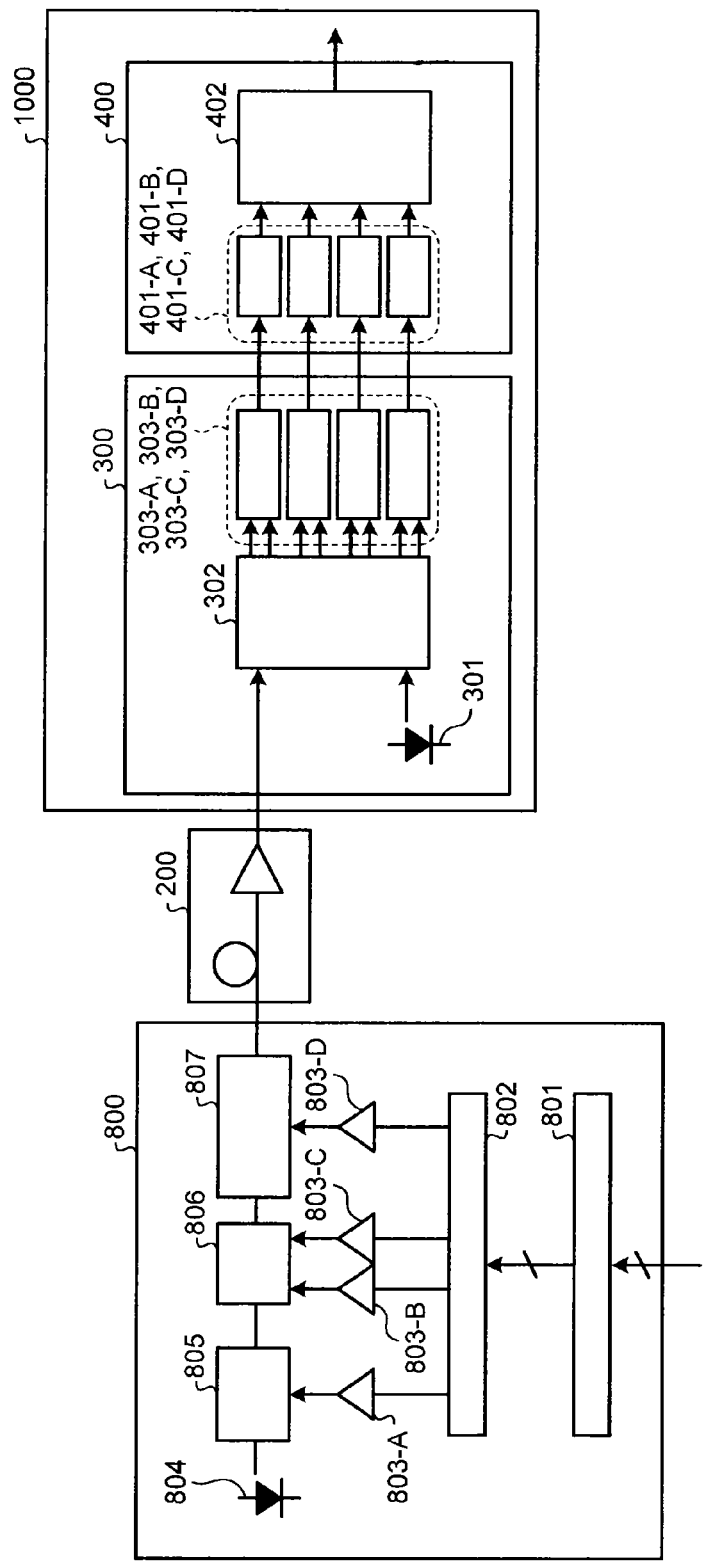
FIG. 13 is a configuration example of an optical transfer system according to a second embodiment of the present invention.

FIG. 13 is a configuration example of an optical transfer system according to the present embodiment. Constituent elements having functions identical to those of the first embodiment in FIG. 1 are denoted by like reference signs and redundant explanations thereof will be omitted. The optical transfer system according to the present embodiment includes an optical transmission unit (optical transmission device) 800, the optical transfer unit 200, and the optical reception device 1000. As shown in FIG. 13, the optical transmission unit 800 includes a first electric signal source 801, a second electric signal source 802, electric amplifiers 803-A, 803-B, 803-C, and 803-D, a light source 804, and a Mach-Zehnder modulator 805. Functions of the optical transfer unit 200, the optical reception unit 300, and the received electric-signal processing unit 400 according to the present embodiment are identical to those according to the first embodiment, and thus explanations thereof will be omitted.

An operation of the optical transfer system according to the present embodiment is explained below. An example of generating a 40 Gbit/s polarization-multiplexed and interleaved QPSK optical signal is explained below. The present embodiment can be applied to other transfer rates and various modulation methods, and is not limited to this example.

The first electric signal source 801 generates an electric signal ex for generating an X-polarization optical signal Ex, an electric signal ey for generating a Y-polarization optical signal Ey, and a clock signal, and outputs the clock signal, and electric signals ex and ey expanded in parallel to the second electric signal source 802. The ex consists of an I-axis signal exI and a Q-axis signal exQ, and ey consists of an I-axis signal eyI and a Q-axis signal eyQ, and it is assumed that $$exI = xI1, xI2,\qquad(20),$$

$$exQ = xQ1, xQ2,\qquad(21),$$

$$eyI = yI1, yI2,\qquad(22),$$

and $$eyQ = yQ1, yQ2,\qquad(23).$$

However, the present invention is not limited to these assumptions. The electric signals ex and ey correspond to an example of the first electric signal in the present invention, and the clock signal corresponds to an example of the second electric signal in the present invention.

The second electric signal source 802 generates two 2 fs (=20 Gsymbol/s) data signals (I-axis signal and Q-axis signal) from the electric signals ex and ey input from the first electric signal source 801 and expanded in parallel, and outputs the I-axis signal to the electric amplifier 803-B and outputs the Q-axis signal to the electric amplifier 803-C. The second electric signal source 802 generates two fs (=10 gigahertz) clock signals from the clock signal input from the first electric signal source 801, and outputs one clock signal to the electric amplifier 803-A and outputs the other clock signal to the electric amplifier 803-D. It is assumed here that an I-axis signal eI and a Q-axis signal eQ include a signal exy in which the electric signals ex and ey are alternately time-division multiplexed. For example, it can be assumed that the I-axis signal eI and the Q-axis signal eQ are obtained in the following manner. That is, bit ordering is set so that $$eI = xI1, yI1, xI2, yI2,\qquad(24),$$

and $$eQ = xQ1, yQ1, xQ2, yQ2,\qquad(25).$$

However, the present invention is not limited to these assumptions. The two data signals correspond to an example of the third electric signal, and the two clock signals correspond to an example of the fourth electric signal in the present invention.

The electric amplifier 803-A amplifies the fs (=10 gigahertz) clock signal input from the second electric signal source 802 up to substantially twice the half-wavelength voltage of the Mach-Zehnder modulator 805, and outputs the clock signal to the Mach-Zehnder modulator 805. The electric amplifier 803-B amplifies the 2 fs (=20 Gsymbol/s) I-axis signal input from the second electric signal source 802 up to substantially twice the half-wavelength voltage of a dual-parallel Mach-Zehnder modulator 806, and outputs the signal to the dual-parallel Mach-Zehnder modulator 806. The electric amplifier 803-C amplifies the 2 fs (=20 Gsymbol/s) Q-axis signal input from the second electric signal source 802 up to substantially twice the half-wavelength voltage of the dual-parallel Mach-Zehnder modulator 806, and outputs the signal to the dual-parallel Mach-Zehnder modulator 806. The electric amplifier 803-D amplifies the fs (=10 gigahertz) clock signal input from the second electric signal source 802 until the clock signal becomes substantially the same as the half-wavelength voltage of a polarization modulator 807, and outputs the clock signal to the polarization modulator 807.

The light source 804 generates CW light, and outputs the CW light to the Mach-Zehnder modulator 805. The Mach-Zehnder modulator 805 performs CSRZ modulation to the CW light input from the light source 804 with the amplified fs (=10 gigahertz) signal input from the electric amplifier 803-A to generate a CSRZ optical signal, and outputs the CSRZ optical signal to the dual-parallel Mach-Zehnder modulator 806. The Mach-Zehnder modulator 805 corresponds to an example of the pulse-signal generation unit according to the present invention.

The dual-parallel Mach-Zehnder modulator 806 performs QPSK modulation to the CSRZ optical signal input from the Mach-Zehnder modulator 805 by using the amplified 2 fs (=20 Symbol/s) I-axis signal input from the electric amplifier 803-B and the amplified 2 fs (=20 Symbol/s) Q-axis signal input from the electric amplifier 803-C to generate a CSRZ-QPSK optical signal, and outputs the CSRZ-QPSK optical signal to the polarization modulator 807. The dual-parallel Mach-Zehnder modulator 806 corresponds to an example of the present data modulation unit according to the present invention.

The polarization modulator 807 polarization-modulates the CSRZ-QPSK optical signal input from the dual-parallel Mach-Zehnder modulator 806 by the amplified fs (=10 gigahertz) clock signal input from the electric amplifier 803-D to generate a polarization-multiplexed and interleaved QPSK optical signal, and outputs the polarization-multiplexed and interleaved QPSK optical signal to the optical transfer unit 200. Accordingly, the polarization-multiplexed and interleaved QPSK optical signal having a delay difference of Ts/2 (50 picoseconds) between the X-polarization optical signal and the Y-polarization optical signal is generated by the dual-parallel Mach-Zehnder modulator 806 and the polarization modulator 807. The polarization modulator 807 corresponds to an example of the polarization interleaving unit according to the present invention. A waveform of the electric signal driving the polarization modulator 807 is a sine wave with a peak amplitude being equal to the half-wavelength voltage of the polarization modulator. However, by setting the waveform to a rectangular wave having the same amplitude, a polarization switching time can be shortened, thereby contributing to suppression of polarization separation on the reception side and a waveform distortion at the time of transfer. To set the waveform to the rectangular wave, a method of using a limiting-type driver as the electric amplifier 803-D, a method of using an electric amplifier having a multistage structure on the electric amplifier 803-D, or a method of forming a rectangular electric waveform by a flip-flop (not shown) on an upstream side of the electric amplifier 803-D can be used.

Figure 14:
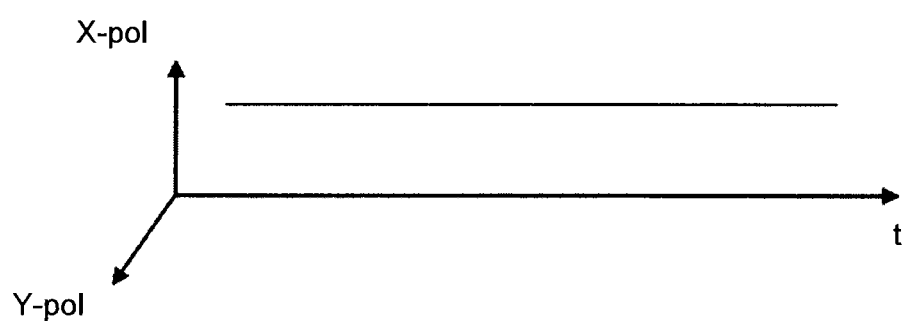
FIG. 14 is an example of a time waveform of CW light generated by an optical transmission unit according to the second embodiment of the present invention.
Figure 15:
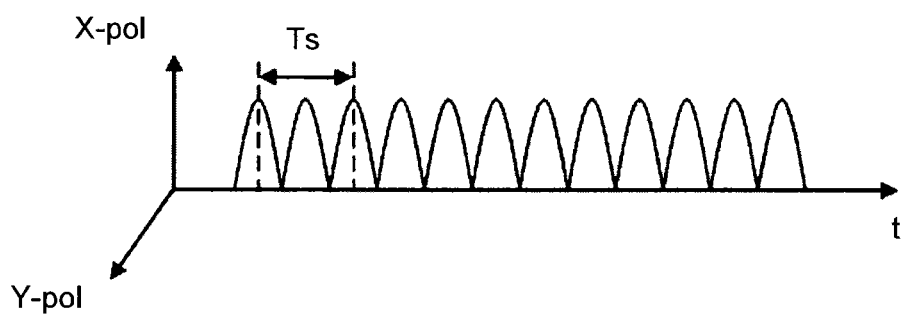
FIG. 15 is an example of a time waveform of a CSRZ optical signal generated by the optical transmission unit according to the second embodiment of the present invention.
Figure 16:
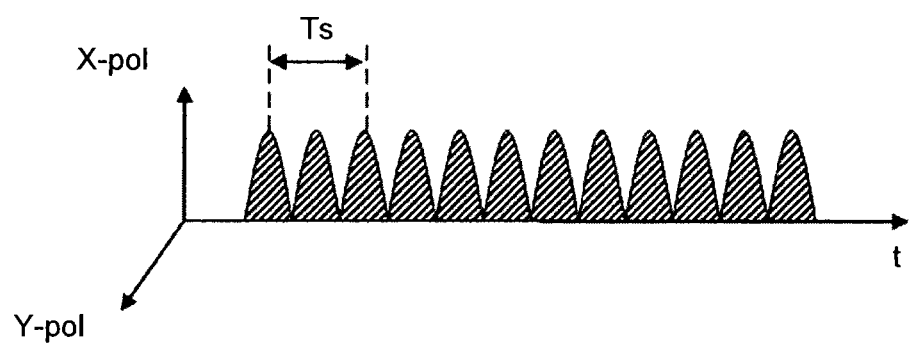
FIG. 16 is an example of a time waveform of a CSRZ-QPSK optical signal generated by the optical transmission unit according to the second embodiment of the present invention.
Figure 17:
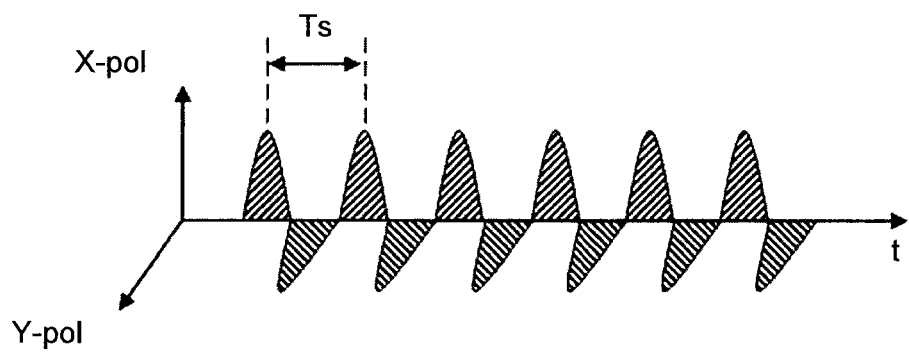
FIG. 17 is an example of a time waveform of a polarization-multiplexed and interleaved QPSK optical signal generated by the optical transmission unit according to the second embodiment of the present invention.

FIG. 14 to 17 depict a change in a time waveform of an optical signal generated by the optical transmission unit 800 according to the present embodiment. FIG. 14 depicts a time waveform of CW light output from the light source 804. The CW light is CSRZ modulated by the Mach-Zehnder modulator 805 and is changed to a CSRZ optical signal shown in FIG. 15. An optical phase of the waveform of the CSRZ optical signal is alternately inverted for each pulse. However, the CW light is pulsed by a repetition frequency 2 fs (=20 gigahertz) in terms of optical power. The CSRZ optical signal is QPSK modulated by the dual-parallel Mach-Zehnder modulator 806, and is changed to a CSRZ-QPSK optical signal shown in FIG. 16. The CSRZ-QPSK optical signal is polarization modulated by the polarization modulator 807, and is changed to a polarization-multiplexed and interleaved QPSK optical signal shown in FIG. 17. As shown in FIG. 17, the polarization modulator 807 distributes a single-polarization signal component (FIG. 16) into two polarization components alternately for each symbol to generate the polarization-multiplexed and interleaved QPSK optical signal.

The second electric signal source 802 performs synchronous control for bit-synchronizing the timing of the CSRZ modulation, QPSK modulation, and polarization modulation. The bit synchronizing method is the same as that of the first embodiment. The timing is determined based on the clock signal input to the Mach-Zehnder modulator 805 and the polarization modulator 807. Similarly to the first embodiment, the timing is determined based on the non-transition region of the clock signal. When the non-transition region is set to the synchronizing timing, the non-transition region of the clock signal input to the polarization modulator substantially matches a central portion of the CSRZ-QPSK optical signal output from the dual-parallel Mach-Zehnder modulator 806.

In the above example, an example of using the CSRZ modulation as the pulsed modulation has been explained. However, it is needless to mention that, even if other RZ modulation such as 50% RZ modulation and 33% RZ modulation is used, identical effects can be obtained.

As described above, in the present embodiment, the Mach-Zehnder modulator 805 performs CSRZ modulation, the dual-parallel Mach-Zehnder modulator 806 performs data modulation, and the polarization modulator 807 performs the polarization-multiplexed modulation. Accordingly, the same polarization-multiplexed and interleaved QPSK optical signal as that of the first embodiment can be obtained.

As is obvious from a comparison between FIG. 1 and FIG. 13, the electric signals input for data modulation are changed from four to two. Accordingly, the circuits of the first electric signal source and the second electric signal source can be simplified and cost reduction can be realized, as compared to a case of generating the four electric data signals.

Furthermore, even when 2m (m≥3) optical signals are to be generated for data modulation by combining alternate polarization distribution with generation of the single-polarization signal, the m electric signal sources consisting of first second electric signal sources can handle such cases, and the circuit of the electric signal source can be simplified and cost reduction can be realized even if the signal source increases in the future.

In the first and second embodiments, the positional relation of the pulse-signal generation unit, the data modulation unit, and the polarization interleaving unit is such that these are arranged in order of the pulse-signal generation unit, the data modulation unit, and polarization interleaving unit. However, the order thereof has no limitation, and arrangements other than that of the above order can realize identical functions.

Figure 18:
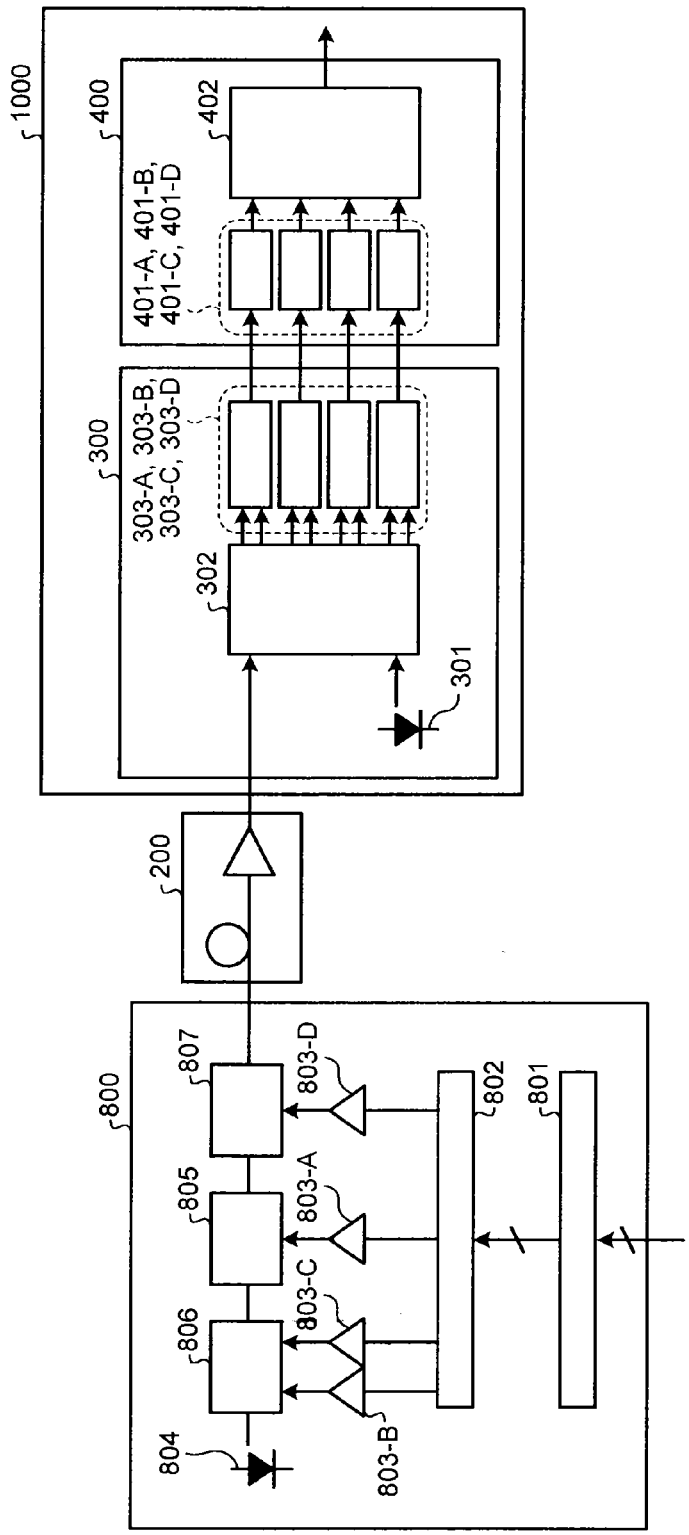
FIG. 18 is a configuration example of an optical transfer system in which the arrangement of the optical transmission unit shown in FIG. 13 is changed.

FIG. 18 is a configuration example of an optical transfer system in which the arrangement of the optical transmission unit according to the second embodiment is changed. In the example, the data modulation unit is arranged on an upstream side of the pulse-signal generation unit. This arrangement improves the sensitivity of DC bias control, and the transfer quality can be maintained in a favorable state. The control of optical components is facilitated and the control circuit can be simplified and cost reduction thereof can be realized.

The DC bias control of the optical modulator for data modulation is essential for ensuring favorable transfer quality. The sensitivity of the DC bias control depends on an average optical power input to the optical modulator. Because the DC bias control of the data modulation requires a control gain 10 times to 100 times higher than that of the pulsed modulation, as the average optical power increases, the DC bias control has an advantage in the control sensitivity. When data modulation is performed on the upstream side of the pulsed modulation, an insertion loss and a modulation loss of the optical modulator for pulsed modulation can be avoided. Accordingly, the average optical power input to the optical modulator for data modulation can be increased, and the sensitivity of the DC bias control in data modulation can be improved. As a result, the control of optical components is facilitated and the control circuit can be simplified and cost reduction thereof can be realized.

Figure 19:
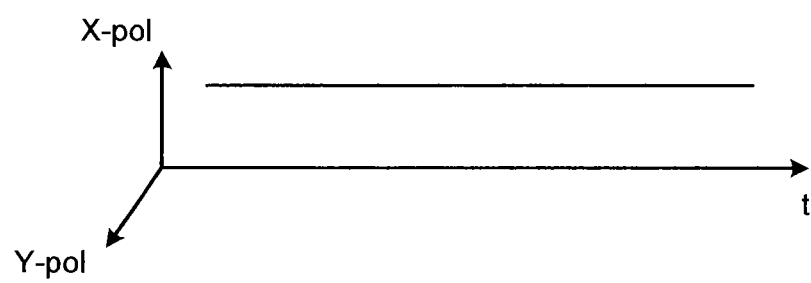
FIG. 19 is an example of a time waveform of CW light generated by the optical transmission unit shown in FIG. 18.
Figure 20:
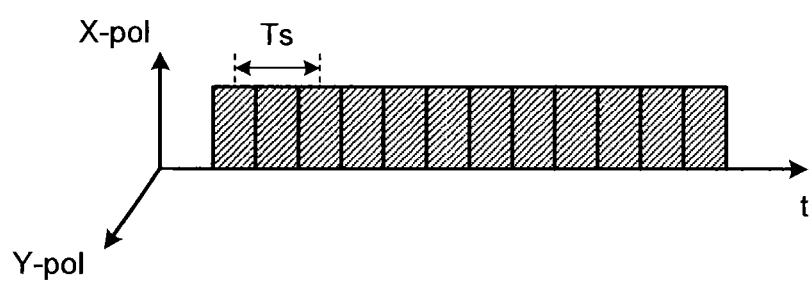
FIG. 20 is an example of a time waveform of a QPSK optical signal generated by the optical transmission unit shown in FIG. 18.
Figure 21:
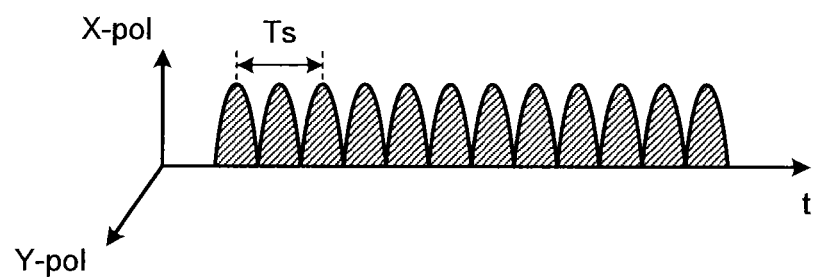
FIG. 21 is an example of a time waveform of a CSRZ-QPSK optical signal generated by the optical transmission unit shown in FIG. 18.
Figure 22:
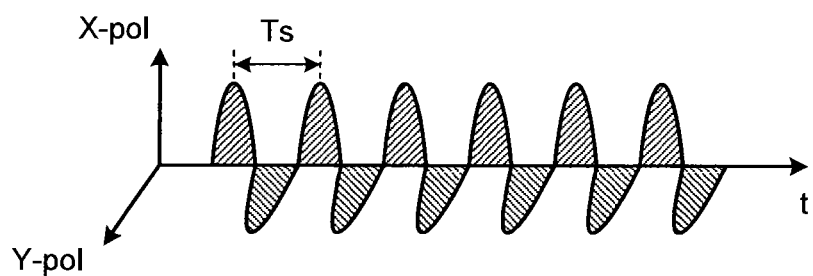
FIG. 22 is an example of a time waveform of a polarization-multiplexed and interleaved QPSK optical signal generated by the optical transmission unit shown in FIG. 18.
Figure 23:
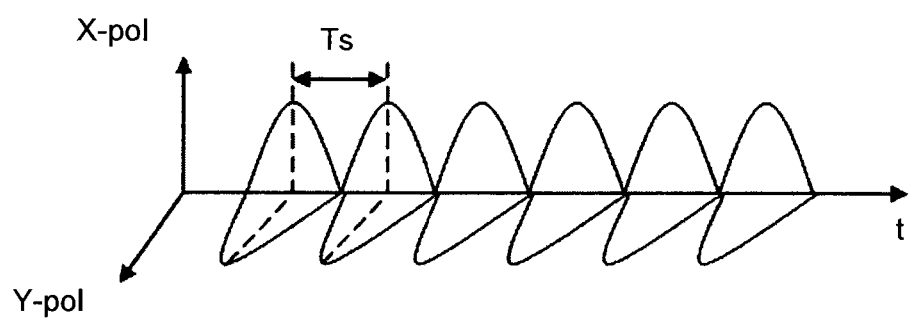
FIG. 23 is an example in which signal components are bit-synchronized, among diagrams of a time waveform of a polarization multiplexing signal in the conventional method.
Figure 24:
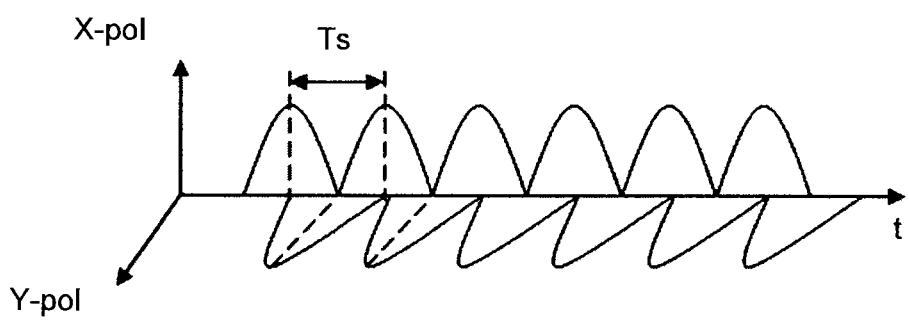
FIG. 24 is an example in which signal components are shifted by a half symbol on a time axis, among diagrams of a time waveform of the polarization multiplexing signal in the conventional method.

FIG. 19 to 22 depict a change in a time waveform of an optical signal output from the optical transmission unit in the arrangement shown in FIG. 18. FIG. 19 depicts a time waveform of CW light output from the light source 804. The CW light is QPSK modulated by the dual-parallel Mach-Zehnder modulator 806, and is changed to a QPSK optical signal shown in FIG. 20. The QPSK optical signal is CSRZ modulated by the Mach-Zehnder modulator 805, and is changed to a CSRZ-QPSK optical signal shown in FIG. 21. The CSRZ-QPSK optical signal is polarization modulated by the polarization modulator 807, and is changed to a polarization-multiplexed and interleaved QPSK optical signal shown in FIG. 22.

Also in the first embodiment, the data modulation unit can be arranged on the upstream side of the pulse-signal generation unit. However, if a lithium-niobate modulator widely used for the pulse-signal generation unit is used, only one of the polarization components of the polarization-multiplexed signal may be pulse modulated due to polarization dependency of the modulator. To avoid this, it suffices to use a polarization independent optical modulator for the pulse-signal generation unit.

In the second embodiment, because the symbol rate becomes twice the symbol rate in the conventional technologies described in Non Patent Literatures 1 and 2, an electric bandwidth required for the reception unit becomes substantially twice. In the digital coherent method, because it is desired that the reception electric bandwidth is in a range of about 40% to 70% of the symbol rate, particularly, 50% to 60%, when the transfer rate is 40 Gb/s, a bandwidth of about 5 to 6 gigahertz becomes optimum in the conventional techniques described in Non Patent Literatures 1 and 2, and a bandwidth of about 10 to 12 gigahertz becomes optimum in the second embodiment. When the electric bandwidth is excessively wide, the waveform distortion hardly changes, and only mixed noise increases, thereby deteriorating the performance. When the electric bandwidth is excessively narrow, mixed noise decreases; however, the waveform distortion increases considerably, thereby deteriorating the performance as well.

When a redundant bit by an error correction code is added, even if a payload transfer rate is 40 Gb/s, a line rate may increase to about 50 Gb/s. In this case, in the conventional technologies described in Non Patent Literatures 1 and 2, a bandwidth of 6.25 to 7.5 gigahertz becomes optimum and a bandwidth of about 12.5 to 15 gigahertz becomes optimum in the first embodiment.

In the second embodiment, particularly when the payload transfer rate is about 40 Gb/s, an input signal with respect to the second electric signal source 802 is generally a 16 parallelized SFI-5 (Serdes Frame Interface Level 5) signal, and a 16:2 multiplexer is used as the electric signal source 2. The 16:2 multiplexer having a transfer rate of 40 Gb/s is a component generally available in optical communications.

INDUSTRIAL APPLICABILITY

As described above, the optical transfer system according to the present invention is useful as an optical transfer system using a digital coherent method, and is particularly suitable for an optical transfer system that performs long distance communications.

REFERENCE SIGNS LIST 100, 800 optical transmission unit
101, 801 first electric signal source
102, 802 second electric signal source
103-A, 103-B, 103-C, 103-D, 103-E, 803-A, 803-B, 803-C,
803-D electric amplifier
104, 804 light source
105, 805 Mach-Zehnder modulator
106 polarization-multiplexing dual-parallel Mach-Zehnder modulator
107 polarization interleaver
108 polarization-multiplexing and interleaving modulator
200 optical transfer unit
300 optical reception unit
301 local oscillation light source
302 optical 90-degree hybrid
303-A, 303-B, 303-C, 303-D balanced photoelectric convertor
400 received electric-signal processing unit
401-A, 401-B, 401-C, 401-D analog-digital convertor
402 digital-signal processing unit
511 optical branching unit
512 polarization conversion unit
513 optical coupling unit
514-A, 514-B data modulation unit
515 delay unit
611 polarization branching unit
612 non-delay unit
613 delay unit
614 polarization coupling unit
701 fixed-skew adjustment unit
702-A, 702-B wavelength-dispersion compensation unit
703 polarization restoration unit
704-A, 704-B carrier-wave frequency-offset compensation unit
705-A, 705-B carrier-wave phase-offset compensation unit
706-A, 706-B identification unit
806 dual-parallel Mach-Zehnder modulator
807 polarization modulator
1000 optical reception device

The invention claimed is:
1. An optical transfer system comprising:
an optical transmission unit including
a pulse-signal generation unit that generates a pulse signal having a pulse width equal to or less than Ts/2 with respect to a symbol repetition cycle Ts,
a data modulation unit that generates a data modulation signal based on a transmission data signal, and
a polarization interleaving unit that generates a polarization-multiplexed signal in which a delay difference between two polarization components that are substantially orthogonal to each other is one-half (Ts/2) of the symbol repetition cycle Ts;
an optical reception unit including
a local oscillation light source that generates light corresponding to a central wavelength of an optical signal received from the optical transmission unit,
an optical interference unit that causes an interference between light generated by the local oscillation light source and an optical signal received from the optical transmission unit, and
a photoelectric conversion unit that converts an output from the optical interference unit to an electric signal;
a received electric-signal processing unit including an analog-digital conversion unit that converts an electric signal output from the optical reception unit to a digital signal; and
a digital-signal processing unit that performs elimination of a delay difference of Ts/2 between polarized signal components and adaptive equalization of a distortion other than the delay difference with respect to the digital signal, wherein the optical transmission unit generates an optical signal in which respective polarization components are alternately present on a time axis, a time period during which the respective polarization components are simultaneously present on the time axis is substantially zero, and a repetition cycle of optical signals of the respective polarization components becomes Ts.

2. The optical transfer system according to claim 1, comprising an optical transfer unit that connects the optical transmission unit to the optical reception unit, wherein
the optical transfer unit narrows a bandwidth by a passband that is substantially 0.5 to 2.5 times a symbol rate.

3. An optical transmission device comprising:
a first electric signal source that generates a first electric signal and a second electric signal corresponding to two polarization components that are substantially orthogonal to each other;
a second electric signal source that generates third electric signals and a single or plural fourth electric signals synchronized with the third electric signal, based on the first electric signal and the second electric signal;
a data modulation unit that generates a data modulation signal based on a transmission data signal; and
a polarization interleaving unit that generates a polarization-multiplexed signal in which a delay difference between two polarization components that are substantially orthogonal to each other is one-half (Ts/2) of a symbol repetition cycle Ts, wherein
the optical transmission device generates an optical signal in which respective polarization components are alternately present on a time axis, a time at which the respective polarization components are simultaneously present on the time axis is substantially zero, and a repetition cycle of optical signals of the respective polarization components becomes Ts.

4. The optical transmission device according to claim 3, wherein the second electric signal source outputs at least two of third electric signals corresponding to an I-axis component and a Q-axis component.

5. The optical transmission device according to claim 4, wherein
the data modulation unit modulates data of a single-polarization optical signal, and
the polarization interleaving unit distributes a data-modulated single-polarization optical signal alternately to two polarization components.

6. The optical transmission device according to claim 5, wherein the polarization interleaving unit distributes the single-polarization optical signal alternately to two polarization components by the fourth electric signal input from the second electric signal source.

7. The optical transmission device according to claim 5, wherein the second electric signal source performs 16:2 multiplexing when a payload transfer rate is 40 Gb/s.

8. The optical transmission device according to claim 6, wherein
the polarization interleaving unit is constituted of a polarization modulator, and
the polarization modulator is driven by the fourth electric signal, a speed of the fourth electric signal is approximately ¼ of a bit rate, and an amplitude of the fourth electric signal that drives the polarization modulator is substantially equal to a half-wavelength voltage of the polarization modulator.

9. The optical transmission device according to claim 3, wherein a non-transition region of the fourth electric signal substantially matches a center of data of the data modulation signal.

10. The optical transmission device according to claim 3, wherein the fourth electric signal has a rectangular waveform.

11. The optical transmission device according to claim 3, further comprising a pulse-signal generation unit that generates a pulse signal having a pulse width equal to or less than Ts/2.

12. The optical transmission device according to claim 11, wherein the pulse-signal generation unit is driven by the fourth electric signal.

13. The optical transmission device according to claim 11, wherein the pulse-signal generation unit performs CSRZ (Carrier Suppressed Return to Zero) modulation.

14. The optical transmission device according to of claim 11, wherein the data modulation unit, the pulse-signal generation unit, and the polarization interleaving unit are arranged in order of the data modulation unit, the pulse-signal generation unit, and the polarization interleaving unit.

15. An optical reception device that receives a polarization-multiplexed signal in which a delay difference between two polarization components that are substantially orthogonal to each other is one-half (Ts/2) of a symbol repetition cycle Ts and a time period during which the respective polarization components are simultaneously present on a time axis is substantially zero, the optical reception device comprising:
a light reception unit including
a local oscillation light source that generates light corresponding to a central wavelength of a received optical signal,
an optical interference unit that causes an interference between light generated by the local oscillation light source and the received optical signal, and
a photoelectric conversion unit that converts an output from the optical interference unit to an electric signal; and
a received electric-signal processing unit including
an analog-digital conversion unit that converts an electric signal output from the optical reception unit to a digital signal, and
a digital-signal processing unit that performs elimination of a delay difference of Ts/2 between polarized signal components and adaptive equalization of a distortion other than the delay difference with respect to the digital signal.

16. The optical reception device according to claim 15, wherein an electric bandwidth is approximately 40% to 70% of a symbol rate.

* * * * *

UNITED STATES PATENT AND TRADEMARK OFFICE
CERTIFICATE OF CORRECTION

PATENT NO. : 8,909,066 B2  
APPLICATION NO. : 13/814617  
DATED : December 9, 2014  
INVENTOR(S) : Tsuyoshi Yoshida et al.

Page 1 of 1

It is certified that error appears in the above-identified patent and that said Letters Patent is hereby corrected as shown below:

On the title page, Item (30), the Foreign Application Priority Data is incorrect.
Item (30) should read:

-- (30)   Foreign Application Priority Data

Nov. 30, 2010   (JP) .................. PCT/JP2010/006967 --

Signed and Sealed this
Seventh Day of April, 2015

Michelle K. Lee
*Director of the United States Patent and Trademark Office*